(12) United States Patent
Ishiguro et al.

(10) Patent No.: US 8,244,212 B2
(45) Date of Patent: Aug. 14, 2012

(54) COMMUNICATION METHOD, COMMUNICATION APPARATUS, CELL PHONE TERMINAL, AND COMMUNICATION SYSTEM FOR PERFORMING CONNECTION VIA A NETWORK

(75) Inventors: Kunihiro Ishiguro, Redwood City, CA (US); Tomihisa Kamada, Tokyo (JP); Hiroyuki Suzuki, Yokohama (JP); Fumio Kawabata, Saitama (JP)

(73) Assignee: Access Co., Ltd., Tokyo (JP)

( * ) Notice: Subject to any disclaimer, the term of this patent is extended or adjusted under 35 U.S.C. 154(b) by 464 days.

(21) Appl. No.: 12/521,303

(22) PCT Filed: Nov. 28, 2007

(86) PCT No.: PCT/JP2007/001311
§ 371 (c)(1),
(2), (4) Date: Jun. 25, 2009

(87) PCT Pub. No.: WO2008/081562
PCT Pub. Date: Jul. 10, 2008

(65) Prior Publication Data
US 2010/0099382 A1 Apr. 22, 2010

(30) Foreign Application Priority Data

Dec. 27, 2006 (JP) .................. 2006-351951

(51) Int. Cl.
*H04M 1/725* (2006.01)
*G06F 21/00* (2006.01)
(52) U.S. Cl. ...................... 455/411; 455/412.1; 713/182
(58) Field of Classification Search .................. 455/448, 455/41.2; 713/156
See application file for complete search history.

(56) References Cited

U.S. PATENT DOCUMENTS

2005/0066163 A1 * 3/2005 Ikenoya ........................ 713/156

FOREIGN PATENT DOCUMENTS

| JP | 2002-77271 A | 3/2002 |
| JP | 2002-271318 A | 9/2002 |
| JP | 2003-209560 A | 7/2003 |
| JP | 2003-298659 A | 10/2003 |
| JP | 2004-363685 A | 12/2004 |
| JP | 2005-64770 A | 3/2005 |
| JP | 2005-159625 A | 6/2005 |
| JP | 2006-50257 A | 2/2006 |
| JP | 2006-180309 A | 7/2006 |

OTHER PUBLICATIONS

International Preliminary Report on Patentability issued Jul. 7, 2009, for PCT Application No. PCT/JP2007/001311 filed Nov. 28, 2007, 5 pages. English translation mailed Jul. 16, 2009, 5 pages.
International Search Report mailed on Feb. 26, 2008, for PCT Application No. PCT/JP2007/001311 filed Nov. 28, 2007, 2 pages. (English translation attached, 2 pages).

* cited by examiner

*Primary Examiner* — George Eng
*Assistant Examiner* — Nizar Sivji
(74) *Attorney, Agent, or Firm* — Morrison & Foerster LLP

(57) ABSTRACT

A home gateway apparatus is connected to a storage apparatus. A cell phone terminal is connected to the home gateway apparatus via an IP network. Upon acknowledging a telephone number from the cell phone terminal, the home gateway apparatus communicates an IP address of the home gateway apparatus to the cell phone terminal. Subsequently, upon acknowledging a connection request to the IP address thus communicated, the home gateway apparatus performs a process of authenticating the connection request, based on the telephone number of the cell phone terminal and the telephone number already acknowledged. Further, the home gateway apparatus makes the storage apparatus available for use by the cell phone terminal thus authenticated via the IP network.

12 Claims, 19 Drawing Sheets

48

48

48

COMMUNICATION METHOD, COMMUNICATION APPARATUS, CELL PHONE TERMINAL, AND COMMUNICATION SYSTEM FOR PERFORMING CONNECTION VIA A NETWORK

TECHNICAL FIELD

The present invention relates to a communication technology and, more particularly, to a communication method, communication device, portable telephone terminal, and communication system for performing connection via a network.

BACKGROUND ART

Recently, development in communication technology has encouraged users to build home networks to link different rooms in a house. A home server system is built by connecting home information appliances to a home network. In a home server system, the home server manages the state of home information appliances and also controls the state thereof. Meanwhile, the widespread use of cell phone terminals with a built-in data communication client has made mobile computing a reality. In mobile computing, cell phone terminals are connected to a server via a network and perform data communication with the server. By blending home server systems and mobile computing, users are capable of accessing home servers using cell phone terminals and controlling the illumination or refrigerator in the house even when the users are away from the house (see, for example, patent document No. 1).

[patent document No. 1] JP 2003-298659

DISCLOSURE OF THE INVENTION

Problem to be Solved by the Invention

By connecting a storage apparatus to a home network, a cell phone terminal is capable of accessing the storage apparatus via the network. According to such a system, the user is capable of using photos and data stored in the storage apparatus by using the cell phone terminal away from home. In the background as described above, we have come to be aware of the following goals to be achieved. For operability of the cell phone terminal and user convenience, it is desirable that the process whereby the cell phone terminal uses the storage apparatus be as simple as possible. In other words, operability, whereby the storage apparatus would look as if it is built in the cell phone terminal despite the fact that it is used via the network, is desirable. Further, it is desired that the security of data stored in the storage apparatus be maintained even when the operation is simplified.

The present invention addresses these goals and a purpose thereof is to provide a communication technology that makes a storage apparatus available for use by a cell phone terminal in a secure and simple manner.

Means to Solve the Problem

To address the aforementioned goal, the communication apparatus according at least one embodiment of the present invention is adapted to be connected to a cell phone terminal via a network and to control read and write operations in a predetermined storage apparatus by the cell phone terminal, and comprises: an acknowledging unit operable to acknowledge a telephone number of the cell phone terminal from the cell phone terminal; a notification unit operable to communicate a network address of the communication apparatus to the cell phone terminal that had the telephone number acknowledged by the acknowledging unit; an authentication unit operable, upon acknowledging a connection request at the network address communicated by the notification unit, to perform a process of authenticating the connection request, based on the telephone number of the cell phone terminal and the telephone number acknowledged by the acknowledging unit; and a communication unit operable to establish a communication path to make the storage apparatus available for use by the cell phone terminal authenticated by the authentication unit.

The term "network address" refers to information for identifying the location of a communication apparatus on a network. For example, the network address may be an Internet protocol (IP) address or a uniform resource locator (URL). Since the telephone number is used according to this embodiment to authenticate the cell phone terminal, the storage apparatus is made available for use by the cell phone terminal in a secure and simple manner.

The acknowledging unit may acknowledge notification indicating that the cell phone terminal is located within a predetermined area, and the authentication unit may suspend a process of authenticating the connection request when the acknowledging unit acknowledges the notification. In this case, the security is improved because authentication of a connection request is suspended if the terminal is located within a predetermined area.

The communication apparatus may comprise an inspection unit operable to issue, via the communication unit, an inquiry to the cell phone terminal to ask whether to continue the communication path before a time of validity of authentication by the authentication unit expires. The authentication may perform a new authentication process by using information other than the telephone number when it is known that the cell phone terminal requests the continuation of the communication path as a result the inquiry by the inspection unit. In this case, the security is improved because the authentication is performed afresh when the time of validity expires such that the telephone number originally used for authentication is not used.

Another embodiment of the present invention relates to a cell phone terminal. The cell phone terminal is adapted to be connected, via a network, to a communication apparatus connected to a storage apparatus, and to perform read and write operations in the storage apparatus, and comprises: a notification unit operable to communicate a telephone number of the cell phone terminal to the communication apparatus; an acknowledging unit operable to acknowledge a network address of the communication apparatus that the notification unit communicated the telephone number to; a requesting unit operable to request a connection to the network address acknowledged by the acknowledging unit, presenting the telephone number; and a communication unit operable to perform communication for reading and writing in the storage apparatus via the communication apparatus over the network, when the communication apparatus authenticates the connection request, based on the telephone number presented by the requesting unit and the telephone number already communicated.

Since the telephone number is used according to this embodiment to authenticate the cell phone terminal, the storage apparatus is made available for use by the cell phone terminal in a secure and simple manner.

Still another embodiment of the present invention relates to a communication system. The communication system comprises: a communication apparatus connected to a storage apparatus; and a cell phone terminal adapted to be connected to the communication apparatus and to perform read and write operations in the storage apparatus. Upon acknowledging a telephone number of the cell phone terminal from the cell phone terminal, the communication apparatus communicates a network address of the communication apparatus to the cell phone terminal, and, subsequently, upon acknowledging from the cell phone terminal a connection request to the network address thus communicated, the communication apparatus performs a process of authenticating the connection request, based on the telephone number of the cell phone terminal and the telephone number already acknowledged, so as to establish a communication path for the cell phone terminal thus authenticated to make the storage apparatus available for use via the network.

Since the telephone number is used according to this embodiment to authenticate the cell phone terminal, the storage apparatus is made available for use by the cell phone terminal in a secure and simple manner.

The communication apparatus may suspend a process of authenticating a connection request when the communication apparatus is notified that the cell phone terminal is located within a predetermined area. In this case, the security is improved because authentication of a connection request is suspended if the terminal is located within a predetermined area.

The communication apparatus may issue an inquiry to the cell phone terminal to ask whether to continue the communication path before a time of validity of authentication of the connection request expires, and performs a new authentication process by using information other than the telephone number when the cell phone terminal requests the continuation of the communication path. In this case, the security is improved because the authentication is performed afresh when the time of validity expires such that the telephone number originally used for authentication is not used.

Yet another embodiment of the present invention relates to a communication method. The communication method comprises: communicating a telephone number of a cell phone terminal from the cell phone terminal to a communication apparatus; and communicating a network address of the communication apparatus from the communication apparatus to the cell phone terminal, wherein, upon acknowledging a connection request to the network address thus communicated from the cell phone terminal, the communication apparatus performs an authentication process, based on the telephone number of the cell phone terminal and the telephone number already communicated, and control read and write operations in the storage apparatus by the cell phone terminal via the network.

Optional combinations of the aforementioned constituting elements, and implementations of the invention in the form of methods, apparatuses, systems, recording mediums and computer programs may also be practiced as additional modes of the present invention.

ADVANTAGE OF THE PRESENT INVENTION

According to the present invention, the storage apparatus is made available for use by the cell phone terminal in a secure and simple manner.

DESCRIPTION OF THE REFERENCE NUMERALS

10 cell phone terminal, 12 terminal antenna, 14 base station apparatus, 16 base station antenna, 18 cell phone network, 20 IP network, 22 home gateway apparatus, 24 storage apparatus, 40 cell phone communication unit, 42 short distance wireless communication unit, 44 central controller, 46 control, 48 display unit, 50 notification unit, 52 acknowledging unit, 54 requesting unit, 60 LAN communication unit, 62 short distance wireless communication unit, 64 controller, 66 connection unit, 68 acknowledging unit, 70 notification unit, 72 authentication unit, 100 virtual storage system

BEST MODE FOR CARRYING OUT THE INVENTION

A summary of the present invention will be given before describing the invention in specific detail. An embodiment of the present invention relates to a virtual storage system where a storage apparatus is installed in a house and the storage apparatus is used via an IP network from a cell phone terminal. A home gateway apparatus connected to the storage apparatus is installed in the house. The home gateway apparatus is connected to an IP network. The user owns the cell phone terminal. The cell phone terminal can be connected to the IP network via a cell phone network. The user in this system uses the cell phone terminal to access the storage apparatus via the cell phone network, IP network, and home gateway apparatus, and use files stored in the storage apparatus. In order to build a system like this that can be used inexpensively and easily, the virtual storage system according to the embodiment performs the following processes.

The cell phone terminal and the home gateway apparatus are provided with interfaces capable of direct wired or radio connection with each other. The cell phone terminal transmits a telephone number to the home gateway apparatus via the interface. The home gateway apparatus transmits the IP address of the apparatus to the cell phone terminal via the interface and the IP network. The cell phone terminal transmits a connection request to the IP address. The connection request includes information on the telephone number. Upon receipt of the connection request, the home gateway apparatus performs a process of authenticating the request based on the telephone number. Upon completion of the authentication, the apparatus permits the cell phone terminal to use the storage apparatus. Authentication by the home gateway apparatus not only serves as authentication for connection to the home gateway apparatus but also serves as authentication for connection to the storage apparatus.

Figure 1:
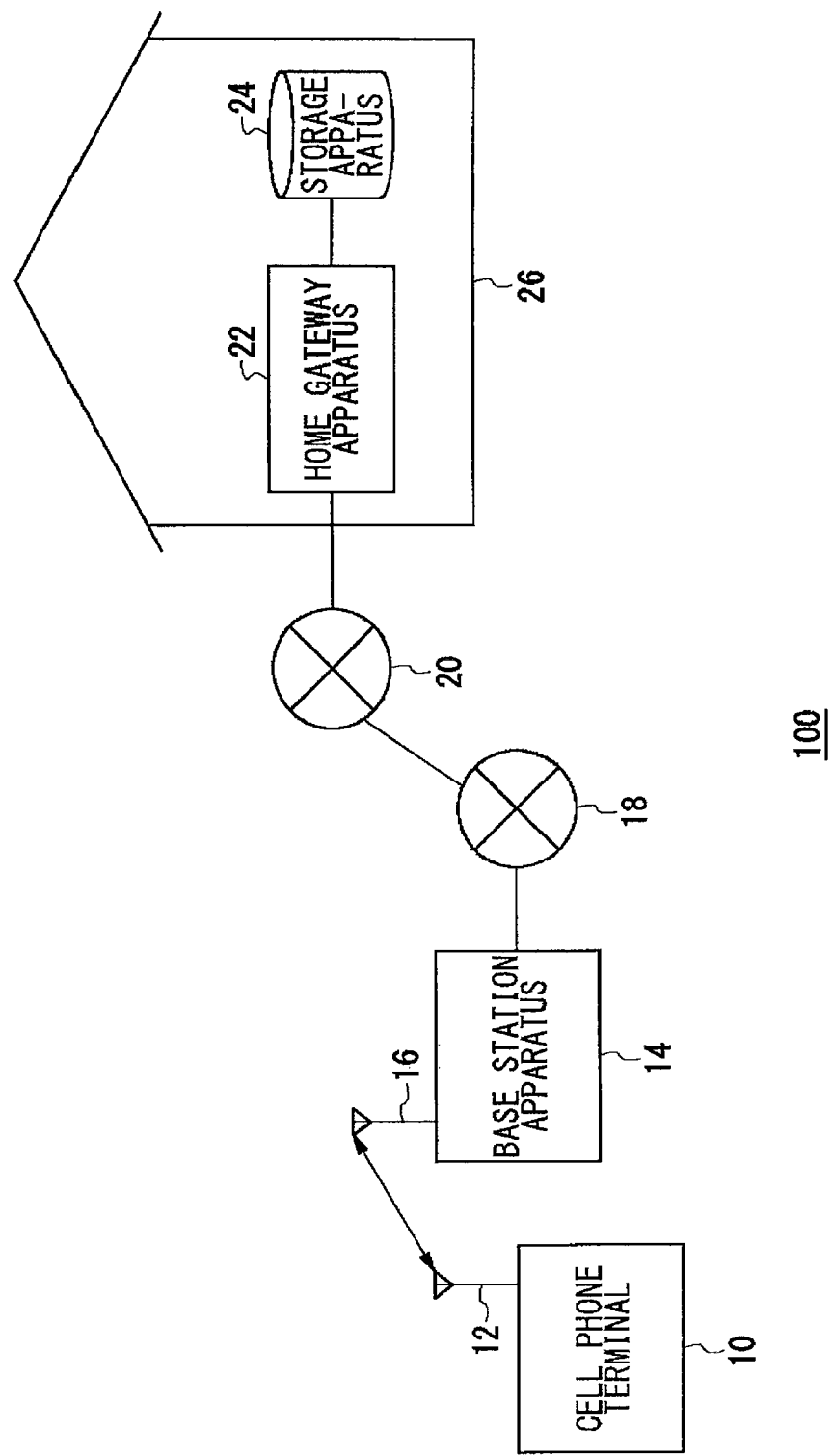
FIG. 1 shows the structure of a virtual storage system according to an embodiment of the present invention.

FIG. 1 shows the structure of a virtual storage system 100 according to an embodiment of the present invention. The virtual storage system 100 includes a cell phone terminal 10, a base station apparatus 14, a cell phone network 18, an IP network 20, a home gateway apparatus 22, and a storage apparatus 24. The cell phone terminal 10 includes a terminal antenna 12. The base station apparatus 14 includes a base station antenna 16. The home gateway apparatus 22 and the storage apparatus 24 are installed in a house 26.

The cell phone terminal 10 is provided with the function adapted to the cell phone communication system and performs communication with the base station apparatus 14 via the terminal antenna 12. The cell phone terminal 10 is also provided with the function adapted to the short distance wireless communication system. The base station apparatus 14 is provided at one end thereof with the base station antenna 16 for connection with the cell phone terminal 10 and is connected at the other end with the cell phone network 18. As the user uses the cell phone terminal 10 to make a phone call, the cell phone terminal 10 is connected to the base station apparatus 14 and the base station apparatus 14 is connected to a telephone apparatus (not shown) via the cell phone network 18. The publicly known technology may be used to implement the function for telephone calls so that the description will be omitted.

The cell phone network 18 is connected to the IP network 20. A gateway apparatus (not shown) may be provided between the cell phone network 18 and the IP network 20. The IP network 20 performs communication processes according the Internet protocol. The cell phone terminal 10 uses the IP network 20 to perform data communication.

The home gateway apparatus 22 is connected at one end with the IP network 20 and is connected at the other end with the storage apparatus 24. The home gateway apparatus 22 may be provided with one terminal so that the apparatus is connected to the IP network 20 and the storage apparatus 24 via the terminal. The home gateway apparatus 22 is also provided with the communication function adapted to the short distance wireless communication system and is capable of directly communicating with the cell phone terminal 10 by using the function. A wired communication system may be used instead of the short distance wireless communication system. The storage apparatus 24 stores data files such for photo data, audio data, etc. The storage apparatus 24 is connected to the home gateway apparatus 22 as mentioned above.

The cell phone terminal 10 uses the short distance wireless communication system to notify the home gateway apparatus 22 of the telephone number. The home gateway apparatus 22 also uses the short distance wireless communication system to notify the cell phone terminal 10 the IP address of the home gateway apparatus 22. Subsequently, the cell phone terminal 10 transmits a connection request to the IP address thus received, via the cell phone network 18 and the home gateway apparatus 22. The home gateway apparatus 22 performs a process of authenticating the connection request based on the telephone number included in the connection request and the telephone number already acknowledged. The authentication also serves as authentication for connection to the storage apparatus 24.

Subsequently, the cell phone terminal 10 communicates with the storage apparatus 24 via the base station apparatus 14, the cell phone network 18, the IP network 20, and the home gateway apparatus 22. As a result of the process as described above, the cell phone terminal 10 is capable of viewing or updating a file stored in the storage apparatus 24 or creating a new file in the storage apparatus 24. The user is capable of viewing photo data, etc. stored in the storage apparatus 24 even when the user is away from home. In other words, the user is capable of reading and writing in the storage apparatus 24 while using the cell phone terminal 10. Once the authentication is completed, an additional authentication process is not performed to allow the cell phone terminal 10 to use the storage apparatus 24. This improves the convenience in using the storage apparatus 24.

Figure 2:
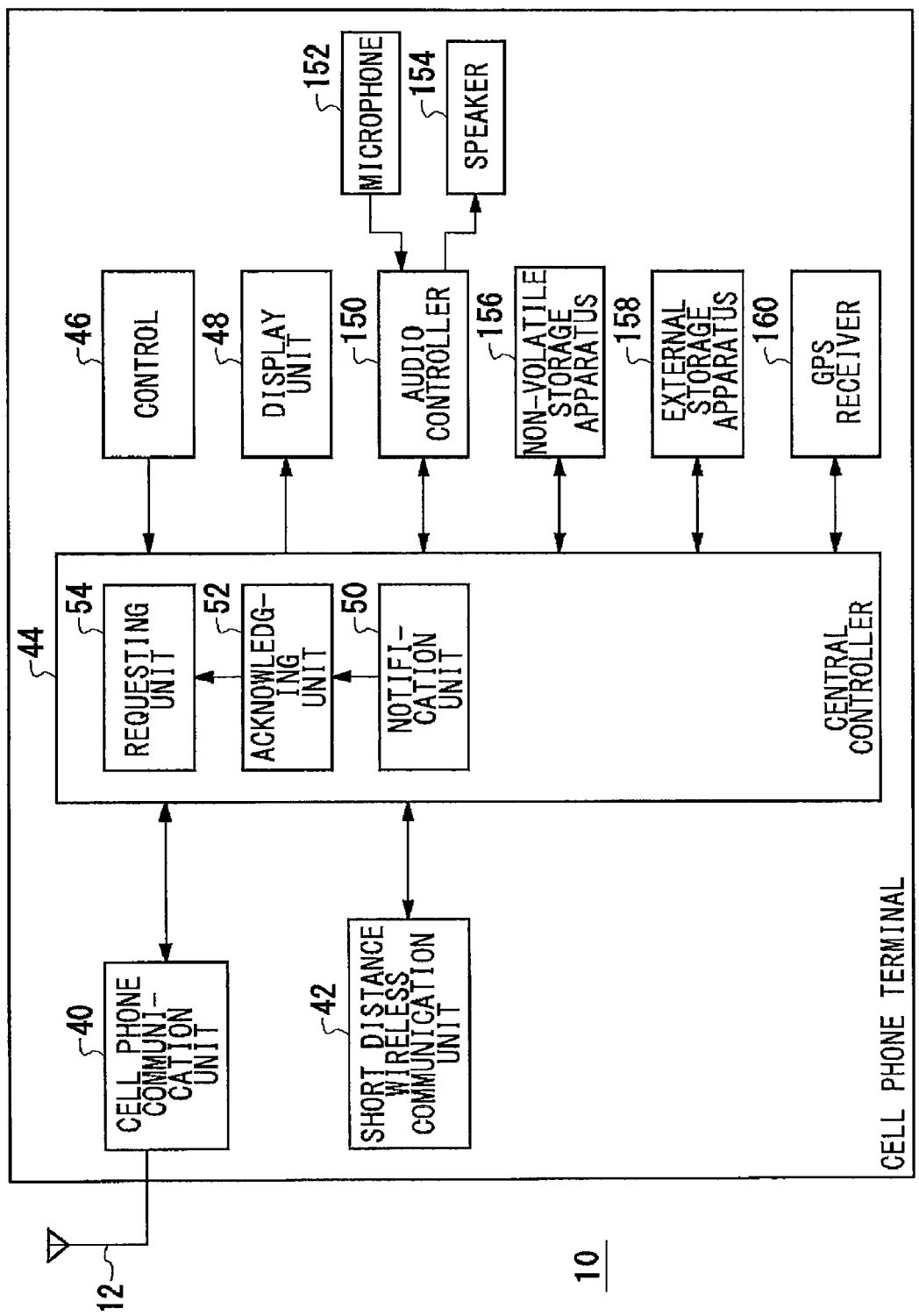
FIG. 2 shows the structure of the cell phone terminal of FIG. 1.

FIG. 2 shows the structure of the cell phone terminal 10. The cell phone terminal 10 includes a terminal antenna 12, a cell phone communication unit 40, a short distance wireless communication unit 42, a central controller 44, a control 46, a display unit 48, an audio controller 150, a microphone 152, a speaker 154, a non-volatile storage apparatus 156, an external storage apparatus 158, and a GPS receiver 160. The central controller 44 includes a notification unit 50, an acknowledging unit 52, and a requesting unit 54.

The control 46 comprises a button, etc. to acknowledge an instruction from the user. The control 46 outputs the instruction acknowledged to the central controller 44. The display unit 48 comprises a display and displays the content according to the instruction from the central controller 44. The audio controller 150 is provided in portable information apparatuses with a phone call function, such as the cell phone terminal 10, and is connected to the microphone 152 and the speaker 154 to control audio input and output. The non-volatile storage apparatus 156 is a storage apparatus capable of holding the content for storage even after power-off. Examples of the apparatus 156 include a hard disk drive or a semiconductor memory such as a flash memory.

The external storage apparatus 158 is a drive unit where a removable recording medium is used. Examples of the storage medium include a magnetic disk, an optical disk, a magneto optical disk, or a semiconductor memory. The GPS receiver 160 identifies the location of the portable information apparatus based on a radio wave from an artificial satellite.

The cell phone communication unit 40 performs communication adapted to the cell phone communication system via the terminal antenna 12. The cell phone communication unit 40 performs audio communication or data communication. The telephone number is registered in the cell phone communication unit 40 or in a subscriber identity module (SIM) card provided in the unit 40. In the following description, the telephone number is assumed to be processed. Alternatively, an identification number recorded in the SIM card may be processed instead of the telephone number. The short distance wireless communication unit 42 performs communication adapted to the short distance wireless communication system complying with the IEEE802.15.1 standard or the IEEE802.15.4 standard, or performs communication adapted to the infrared communication system complying with the infrared data association (IrDA).

The notification unit 50 causes the short distance wireless communication unit 42 to communicate the telephone number of the cell phone terminal 10 to the home gateway apparatus 22 (not shown). The notification unit 50 may cause the unit 42 to communicate the telephone number in response to an instruction from the control 46. Alternatively, the unit 50 may initiate the communication of the telephone number automatically when the short distance wireless communication unit 42 detects that the home gateway apparatus 22 is nearby. For example, the short distance wireless communication unit 42 may measure the intensity of a signal from the home gateway apparatus 22 (not shown) and, when the signal intensity as measured is greater than a threshold value, it is determined that the home gateway apparatus 22 is nearby. Upon completion of the communication of the telephone number, the notification unit 50 may notifies the acknowledging unit 52 accordingly with an associated output.

When the notification unit 50 has communicated the telephone number, the acknowledging unit 52 acknowledges the IP address of the home gateway apparatus 22 from the home gateway apparatus 22, via the short distance wireless communication unit 42. The acknowledging unit 52 outputs the IP address thus acknowledged to the requesting unit 54. The requesting unit 54 causes the cell phone communication unit 40 to transmit a request signal destined to the IP address acknowledged by the acknowledging unit 52. The request signal includes the telephone number of the cell phone communication unit 40. In response to the instruction from the requesting unit 54, the cell phone communication unit 40 transmits a request signal by performing data communication with the base station apparatus 14 (not shown). The request signal may be transmitted in response to an instruction from the control 46. Alternatively, the signal may be transmitted automatically when the acknowledging unit 52 acknowledges the IP address.

The connection request from the cell phone communication unit 40 is transmitted to the home gateway apparatus 22 via the base station apparatus 14, cell phone network 18, and IP network 20 (not shown). The home gateway apparatus 22 performs a process of authenticating the connection request by using the telephone number. Details will be described later. When the home gateway apparatus 22 permits the connection, the cell phone communication unit 40 receives a notification of permission from the home gateway apparatus 22. The notification of permission may include information such as a port number for accessing the storage apparatus 24. Upon receipt of the notification of permission, the cell phone communication unit 40 accesses the storage apparatus 24 via the home gateway apparatus 22.

As a result of the access, the central controller 44 acknowledges the content of the storage apparatus 24 (e.g., the directory structure, files, and photo data) via the cell phone communication unit 40. The display unit 48 displays the acknowledged content. The control 46 outputs an instruction to control the storage apparatus 24 (e.g., an instruction for copying or modification) via the cell phone communication unit 40. Through the steps described above, the cell phone terminal 10 is connected to the storage apparatus 24 via the cell phone network 18 and the home gateway apparatus 22 and uses the storage apparatus 24 accordingly.

Figure 3A:
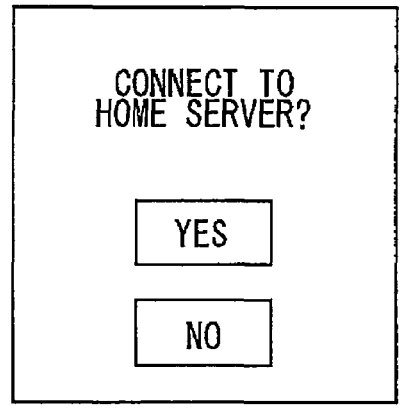
FIGS. 3A-3C show screens displayed on the display unit of FIG. 2.
Figure 3B:
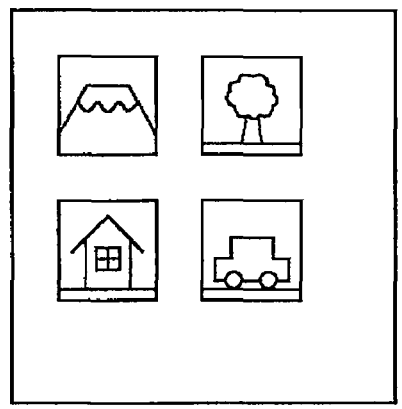
Figure 3C:
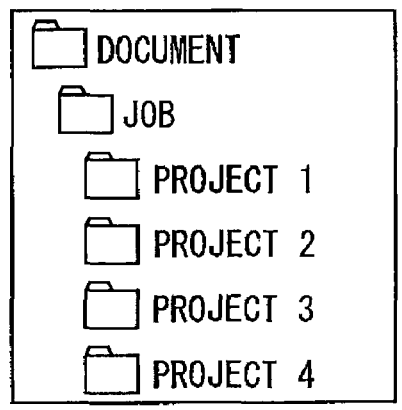

FIGS. 3A-3C show screens displayed on the display unit 48. FIG. 3 shows the content displayed before the requesting unit 54 transmits a connection request. When the user uses the control 46 to select "Yes", the requesting unit 54 causes the cell phone communication unit 40 to transmit a request signal. FIG. 3B shows the content when the storage apparatus 24 is made available via the cell phone communication unit 40. A list of photo data stored in the storage apparatus 24 is shown. FIG. 3C shows the content when the storage apparatus 24 is made available via the cell phone communication unit 40. The directory structure of the storage apparatus 24 is shown. The content of FIGS. 3B and 3C are displayed in the same manner as the content of the non-volatile storage apparatus 156 built in the cell phone terminal 10 is displayed. Thus, the user is capable of using the storage apparatus 24 by using the control in the same manner as using the non-volatile storage apparatus 156.

The configuration is implemented, in hardware, by any CPU of a computer, a memory, or other LSIs and, in software, by a program or the like provided with a function for communication and loaded into the memory. FIG. 2, for example, depicts functional blocks implemented by the cooperation of hardware and software. Therefore, it will be obvious to those skilled in the art that the functional blocks may be implemented in a variety of manners by hardware only, software only, or a combination of thereof.

Figure 4:
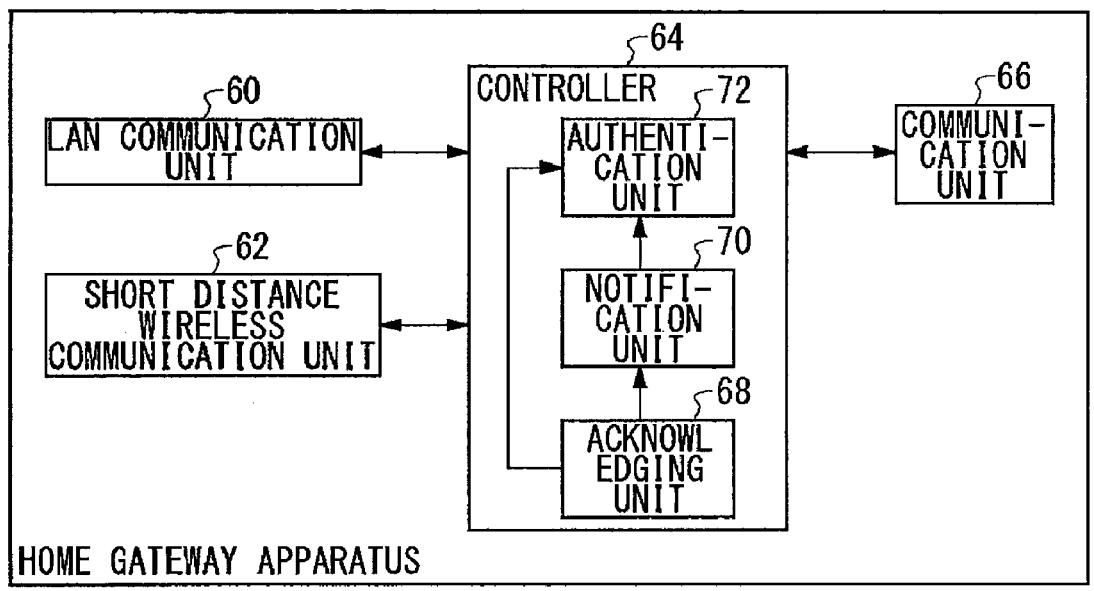
FIG. 4 shows the structure of the home gateway apparatus of FIG. 1.

FIG. 4 shows the structure of the home gateway apparatus 22. The home gateway apparatus 22 includes an LAN communication unit 60, a short distance wireless communication unit 62, a controller 64, and a connection unit 66. The controller 64 includes an acknowledging unit 68, a notification unit 70, and an authentication unit 72.

Like the short distance wireless communication unit 42 mentioned above, the short distance wireless communication unit 62 performs communication adapted to the short distance wireless communication system. The LAN communication unit 60 is connected to the IP network 20 (not shown) and performs communication according to the Internet protocol. Further, the LAN communication unit 60 is assigned an IP address. The connection unit 66 is connected to the storage apparatus 24 (not shown). The connection unit 66 performs communication according to the Internet protocol.

The acknowledging unit 68 acknowledges the telephone number of the cell phone terminal 10 from the cell phone terminal 10 (not shown) via the short distance wireless communication unit 62. In other words, the acknowledging unit 68 uses the short distance wireless communication system to acknowledge the telephone number of the cell phone terminal 10. The acknowledging unit 68 notifies the notification unit 70 that the telephone number is acknowledged and outputs the telephone number thus acknowledged to the authentication unit 72. Upon being notified by the acknowledging unit 68, the notification unit 70 causes the short distance wireless communication unit 62 to transmit the IP address assigned to the LAN communication unit 60 to the cell phone terminal 10. In other words, the notification unit 70 uses the short distance wireless communication system to notify the cell phone terminal 10 of the IP address. The notification unit 70 provides an output to the authentication unit 72 to indicate that that terminal 10 is notified.

After transmitting the information on the IP address to the cell phone terminal 10 according to the instruction from the notification unit 70, the LAN communication unit 60 receives a connection request from the cell phone terminal 10. The LAN communication unit 60 outputs the connection request thus received to the authentication unit 72. The authentication unit 72 retrieves the telephone number from the connection request thus acknowledged. Further, the authentication unit 72 performs a process of authenticating the connection request, based on the telephone number thus retrieved and the telephone number acknowledged by the acknowledging unit 68. When the numbers match, the authentication unit 72 permits the connection from the cell phone terminal 10. As mentioned before, authentication by the authentication unit 72 also serves as authentication for connection to the storage apparatus 24. By permitting the connection to the home gateway apparatus 22, the connection to the storage apparatus 24 is also permitted. When the numbers do not match, the authentication unit 72 refuses the connection from the cell phone terminal 10. When the access is permitted, the authentication unit 72 transmits a notification of permission to the cell phone terminal 10 via the LAN communication unit 60. The notification of permission may include information capable of identifying the network address of the storage apparatus 24, as mentioned before. The authentication unit 72 also notifies the storage apparatus 24 that the connection is permitted via the connection unit 66.

When, after the authentication unit 72 permits the connection, the LAN communication unit 60 acknowledges an instruction originating from the cell phone terminal 10 (not shown) and requesting a process to be performed in the storage apparatus 24, the controller 64 directs the connection unit 66 to output the instruction to the storage apparatus 24 (not shown). When the connection unit 66 acknowledges a response to the instruction, the controller 64 causes the LAN communication unit 60 to output the response to the cell phone terminal 10. In other words, the controller 64, the LAN communication unit 60, and the connection unit 66 allow the authenticated cell phone terminal 10 to use the storage apparatus 24 via the cell phone network 18 and the IP network 20 (not shown). This is equivalent to allowing the LAN communication unit 60 and the connection unit 66 to establish a path of communication between the cell phone terminal 10 and the storage apparatus 24 and to control reading and writing operations performed by the cell phone terminal 10 in the storage apparatus 24.

Figure 5:
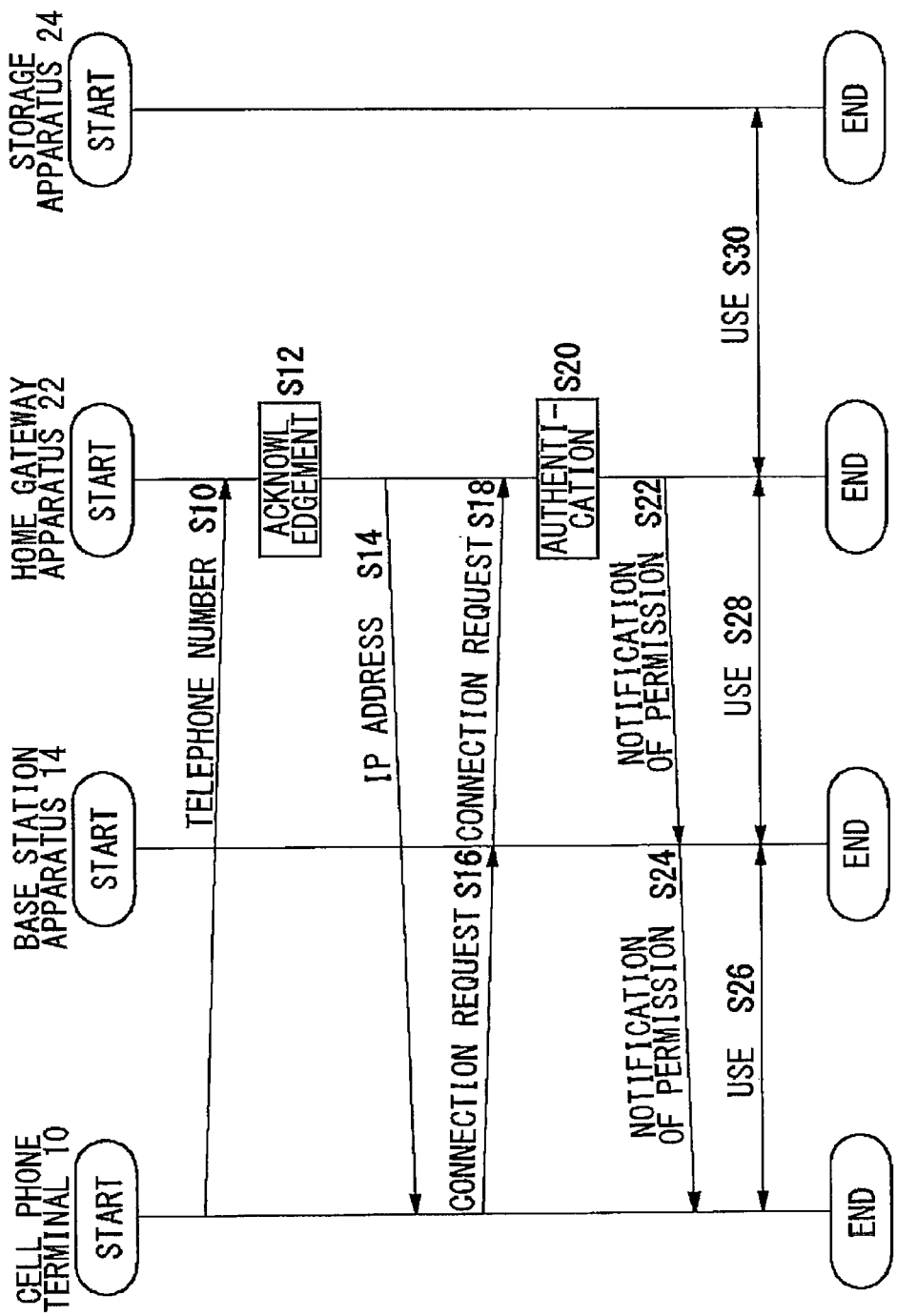
FIG. 5 is a sequence diagram showing the steps performed in the virtual storage system to use the storage apparatus of FIG. 1.

A description will be given of the operation of the virtual storage system 100. FIG. 5 is a sequence diagram showing the steps performed in the virtual storage system 100 to use the storage apparatus 24. The cell phone terminal 10 notifies the home gateway apparatus 22 of the telephone number by using the short distance wireless communication system (S10). The home gateway apparatus 22 acknowledges the telephone number (S12). The home gateway apparatus 22 notifies the cell phone terminal 10 of the IP address by using the short distance wireless communication system (S14). The cell phone terminal 10 transmits a connection request to the home gateway apparatus 22 via the base station apparatus 14, according to the IP address thus acknowledged (S16, S18).

The home gateway apparatus 22 performs authentication based on the telephone number included in the connection request thus received and the telephone number already acknowledged (S20). When the connection is permitted, the home gateway apparatus 22 transmits a notification of permission to the cell phone terminal 10 via the base station apparatus 14 (S22, S24). Subsequently, the cell phone terminal 10 uses the storage apparatus 24 via the base station apparatus 14 and the home gateway apparatus 22 (S26, S28, S30).

Figure 6:
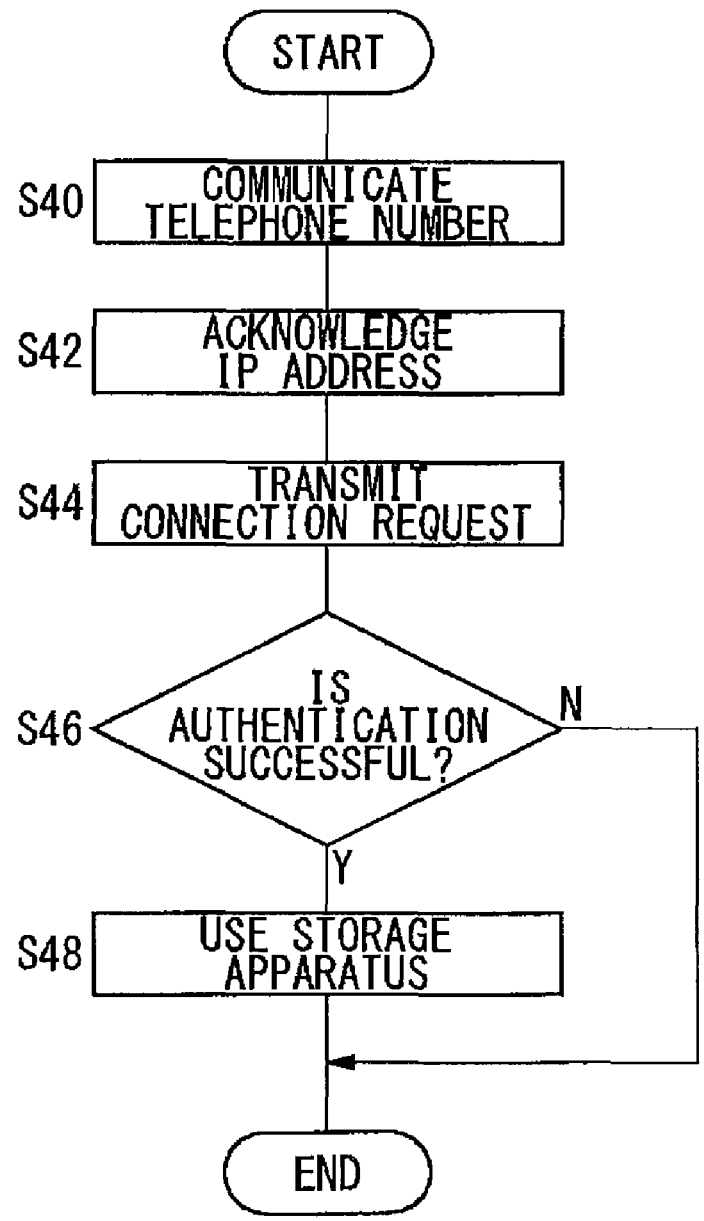
FIG. 6 is a flowchart showing the steps performed in the cell phone terminal of FIG. 2 to use the storage apparatus.

FIG. 6 is a flowchart showing the steps performed in the cell phone terminal 10 to use the storage apparatus 24. The notification unit 50 communicates the telephone number via the short distance wireless communication unit 42 (S40) and the acknowledging unit 52 acknowledges the IP address via the short distance wireless communication unit 42 (S42). The cell phone communication unit 40 transmits a connection request to the home gateway apparatus 22 (S44). When the home gateway apparatus 22 authenticates the request (Y in S46), the control 46 and the display unit 48 use the storage apparatus 24 via the cell phone communication unit 40 (S48). When the home gateway apparatus 22 does not authenticate the request (N in S46), the step 48 is skipped. The process is then terminated.

Figure 7:
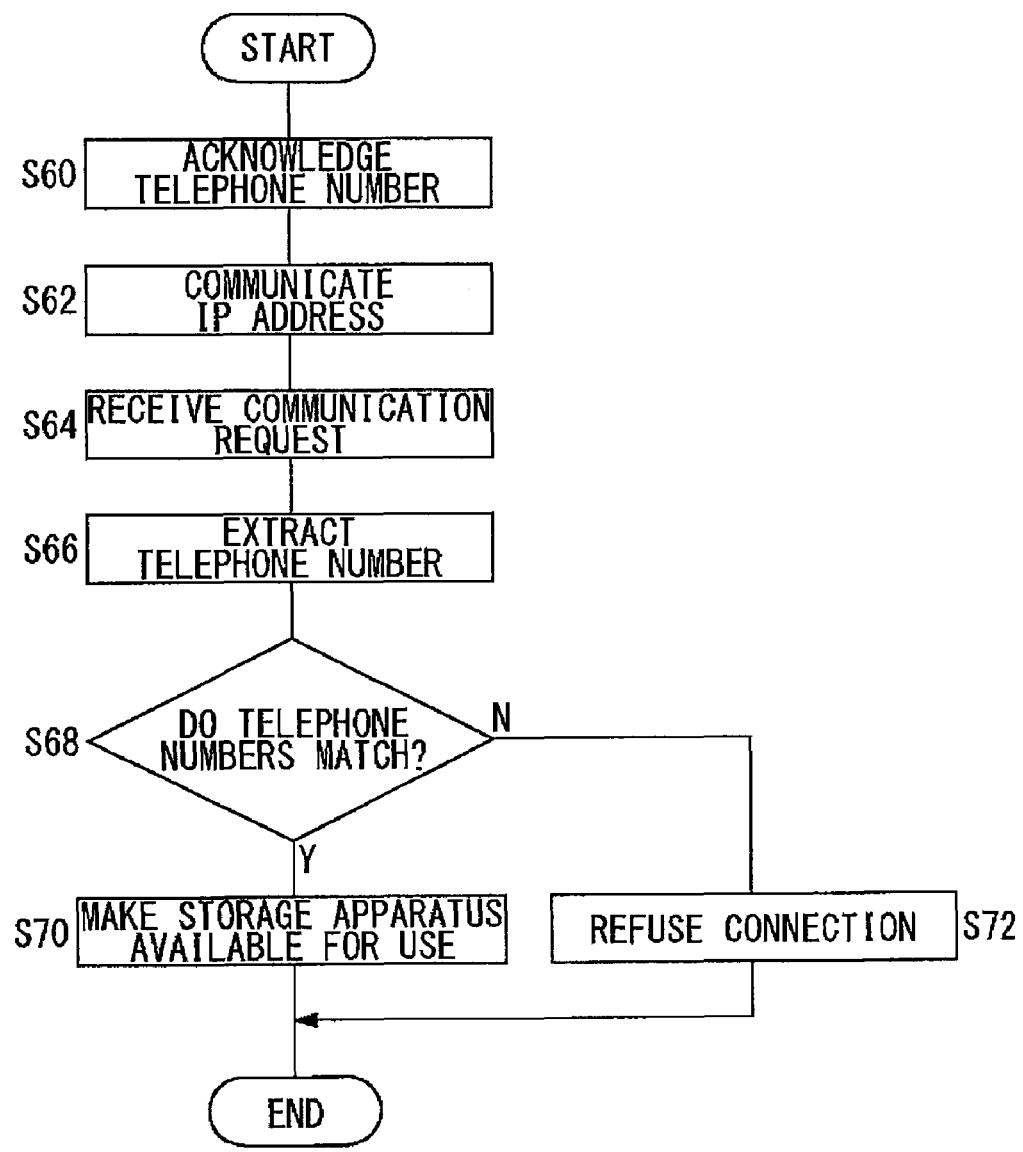
FIG. 7 is a flowchart showing the steps performed in the home gateway apparatus of FIG. 4 to use the storage apparatus.

FIG. 7 is a flowchart showing the steps performed in the home gateway apparatus 22 to use the storage device. The acknowledging unit 68 acknowledges the telephone number via the short distance wireless communication unit 62 (S60). The notification unit 70 communicates the IP address via the short distance wireless communication unit 62 (S62). The LAN communication unit 60 receives a connection request from the cell phone terminal 10 (S64). The authentication unit 72 extracts the telephone number from the connection request (S66). When the extracted telephone number matches the acknowledged telephone number (Y in S68), the authentication unit 72 permits the cell phone terminal 10 to use the storage apparatus 24. The LAN communication unit 60, the controller 64, and the connection unit 66 allow the cell phone terminal 10 to use the storage apparatus 24 (S70). When the telephone numbers do not match (N in S68), the authentication unit 72 refuses the connection from the cell phone terminal 10.

A description will now be given of the first variation. The first variation differs from the embodiment in respect of the method of communicating the IP address from the home gateway apparatus 22 to the cell phone terminal 10. In the embodiment, the short distance wireless communication system is used to communicate the IP address from the home gateway apparatus 22 to the cell phone terminal 10. In the first variation, an electronic mail is used to communicate the IP address from the home gateway apparatus 22 to the cell phone terminal 10 via the IP network 20 and the cell phone network 18. The structures of the virtual storage system 100, the cell phone terminal 10, and the home gateway apparatus 22 according to the first variation is of the same type as those of FIGS. 1, 2, and 4.

When the notification unit 50 of the cell phone terminal 10 communicates the telephone number via the short distance wireless communication unit 42, the unit 50 also communicates the mail address of the cell phone terminal 10. The acknowledging unit 52 receives an electronic mail from the home gateway apparatus 22 via the cell phone communication unit 40. The acknowledging unit 52 examines the content of the electronic mail and extracts information related to the IP address of the home gateway apparatus 22. The requesting unit 54 performs a process similar to that of the embodiment, based on the IP address thus extracted.

When the acknowledging unit 68 of the home gateway apparatus 22 acknowledges the telephone number of the cell phone terminal 10 via the short distance wireless communication unit 62, the unit 68 also acknowledges the mail address of the cell phone terminal 10. The notification unit 70 creates an electronic mail to be transmitted to the mail address thus acknowledged. The electronic mail includes the IP address assigned to the LAN communication unit 60. The notification unit 70 transmits the electronic mail thus created to the cell phone terminal 10 via the LAN communication unit 60.

Figure 8:
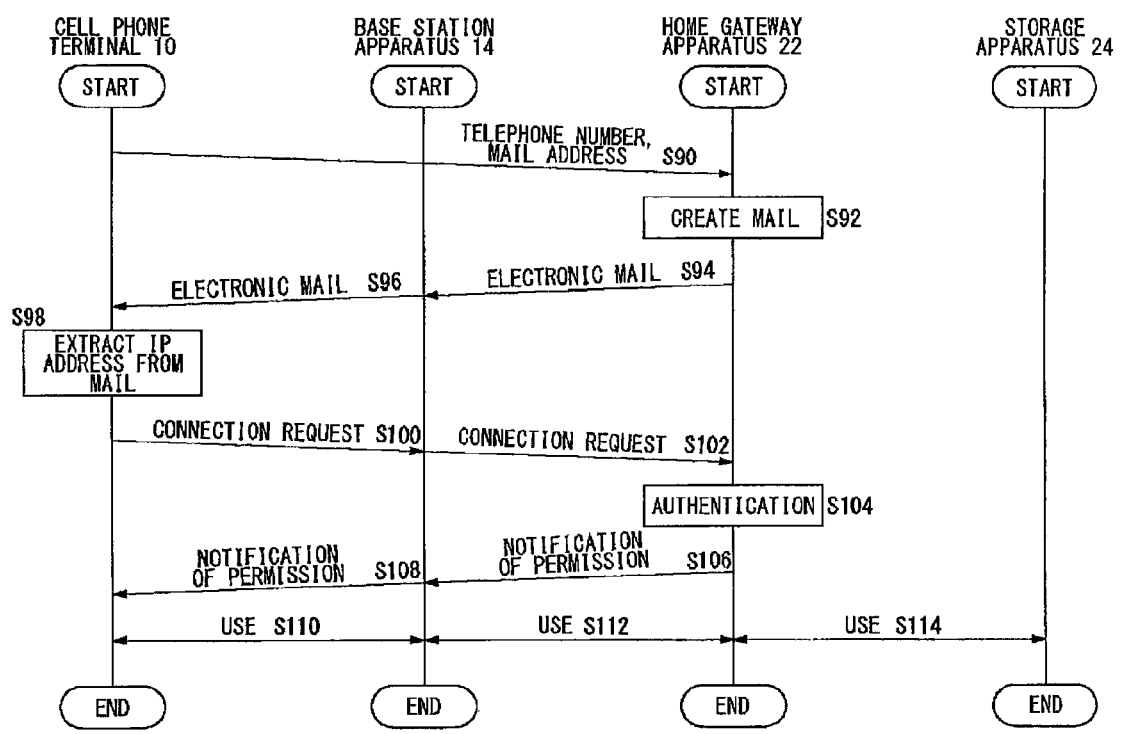
FIG. 8 is a sequence diagram showing the steps performed in the virtual storage system according to the first variation to use the storage apparatus.

FIG. 8 is a sequence diagram showing the steps performed in the virtual storage system 100 according to the first variation to use the storage apparatus 24. The cell phone terminal 10 notifies the home gateway apparatus 22 of the telephone number and the IP address by using the short distance wireless communication system (S90). The home gateway apparatus 22 creates an electronic mail destined to the mail address acknowledged (S92). The home gateway apparatus 22 transmits the electronic mail to the cell phone terminal 10 via the base station apparatus 14 (S94, S96). The cell phone terminal 10 extracts the IP address from the electronic mail received (S98). The cell phone terminal 10 transmits a connection request to the home gateway apparatus 22 via the base station apparatus 14, according to the IP address thus extracted (S100, S102). The subsequent steps 104 through 114 are identical to the steps 20 through 30 of FIG. 5 so that the description thereof is omitted.

A description will now be given of the second variation. The second variation differs from the embodiment and the first variation in respect of the method of communicating the IP address from the home gateway apparatus 22 to the cell phone terminal 10. In the virtual storage system 100 according to the second variation, a center is provided in the IP network 20. The home gateway apparatus 22 registers the IP address in the center and the cell phone terminal 10 issues an inquiry to the center to request the IP address.

Figure 9:
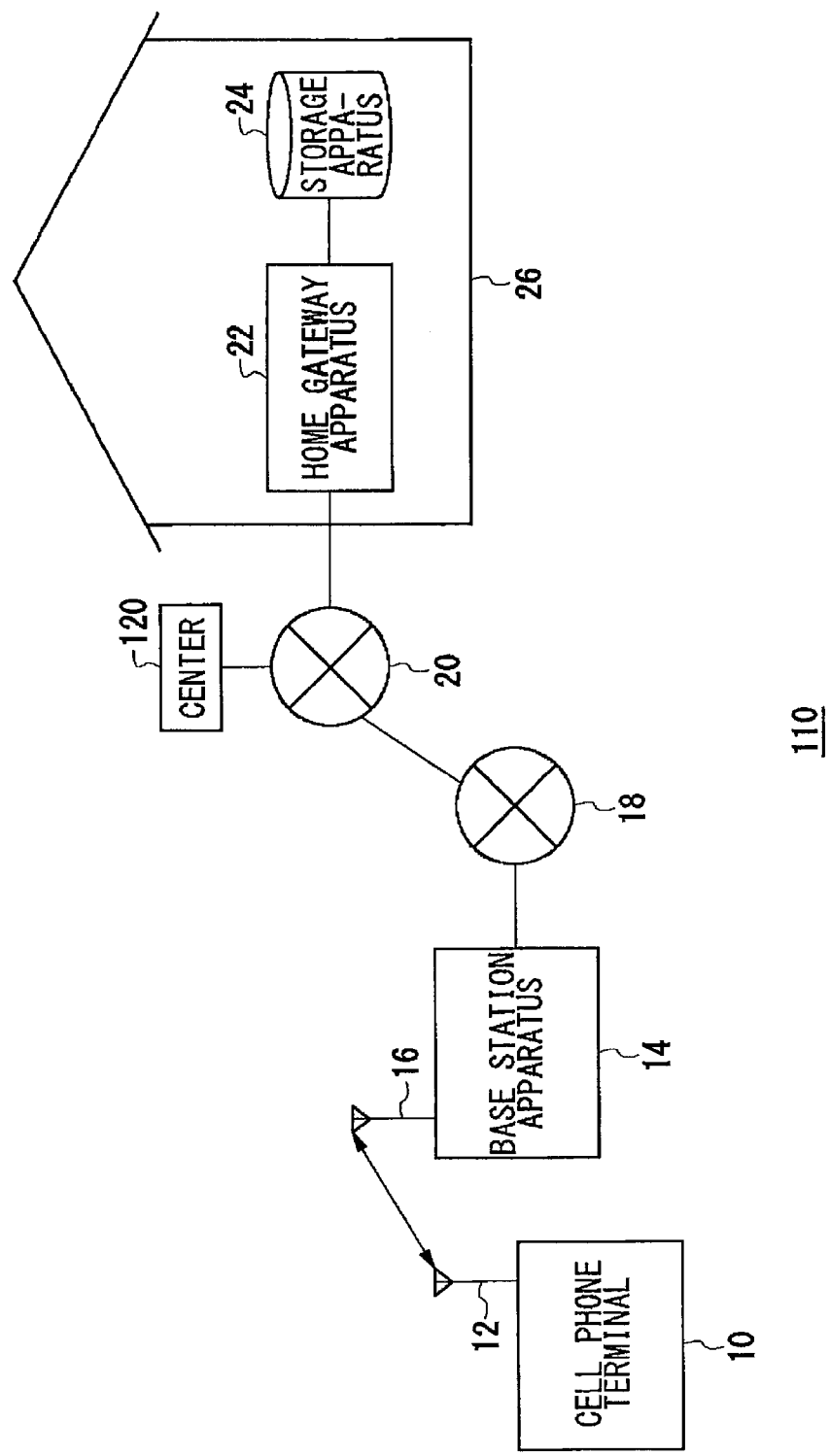
FIG. 9 shows the structure of the virtual storage system according to the second variation.

FIG. 9 shows the structure of a virtual storage system 110 according to the second variation. In addition to the components of the virtual storage system 100 shown in FIG. 1, the virtual storage system 110 includes a center 120. The structures of the cell phone terminal 10 and the home gateway apparatus 22 are of the same type as those of FIGS. 2 and 4.

The center 120 is connected to the IP network 20. The IP address of the center 120 is permanent and is known to the cell phone terminal 10 and the home gateway apparatus 22. For example, the center 120 is managed by a carrier of the cell phone system or an Internet service provider (ISP).

As in the embodiment, the notification unit 50 (not shown) of the cell phone terminal 10 uses the short distance wireless communication system to notify the home gateway apparatus 22 of the telephone number. The notification unit 50 stores the IP address of the center 120. After communicating the telephone number, the notification unit 50 causes the cell phone communication unit 40 to transmit a request for the IP address of the home gateway apparatus 22 to the IP address stored. The request includes the telephone number of the cell phone terminal 10. The request is transmitted to the center 120 via the base station apparatus 14, the cell phone network 18, and the IP network 20.

As descried later, the center 120 performs a process of authenticating the request. When it is determined that the request is permitted, the center 120 generates a response that includes the IP address of the home gateway apparatus 22 and transmits the response back to the cell phone terminal 10 via the same path of communication. The acknowledging unit 52 (not shown) acknowledges the response via the cell phone communication unit 40 and extracts the IP address from the response thus acknowledged. The acknowledging unit 52 outputs the IP address thus extracted to the requesting unit 54 (not shown). The subsequent steps are identical to the corresponding steps of the embodiment so that the description thereof is omitted.

As in the embodiment, the acknowledging unit 68 (not shown) of the home gateway apparatus 22 uses the short distance wireless communication system to acknowledge the telephone number from the cell phone terminal 10. The notification unit 70 (not shown) stores the IP address of the center 120. The notification unit 70 causes the LAN communication unit 60 to transmit a combination of the telephone number acknowledged by the acknowledging unit 68 and the IP address assigned to the LAN communication unit 60 to the IP address stored. The IP address included in the combination is communicated to the cell phone terminal 10 after the authentication process in the center 120. Therefore, the process performed by the notification unit 70 represents communication of the IP address to the cell phone terminal 10. The subsequent steps in the authentication unit 72 (not shown) are identical to the corresponding steps of the embodiment so that the description thereof is omitted.

The center 120 receives the combination from the home gateway apparatus 22. The center 120 also stores the combination. Meanwhile, the center 120 receives a notification request from the cell phone terminal 10 via the base station apparatus 14, the cell phone network 18, and the IP network 20. After extracting the telephone number from the notification request, the center 120 performs a process of authenticating the notification request, based on the telephone number thus extracted and the telephone number included in the combination stored. When the numbers match, the center 120 generates a response to the notification request. As mentioned before, the response includes the IP address included in the combination. The center 120 transmits the response to the cell phone terminal 10 via the IP network 20, the cell phone network 18, and the base station apparatus 14.

Figure 10:
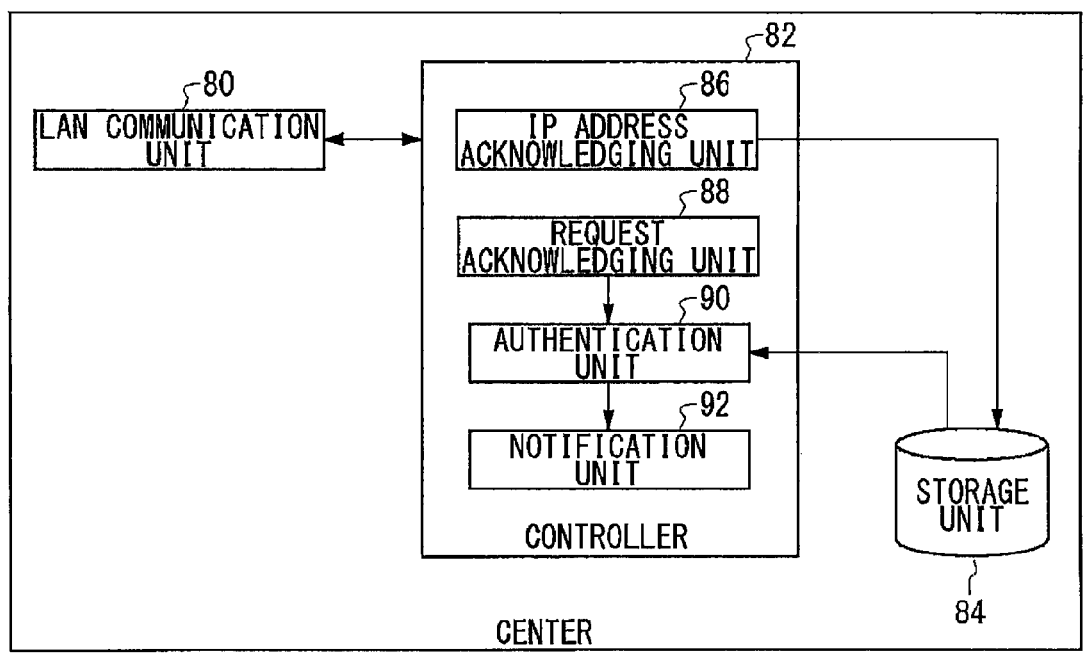
FIG. 10 shows the structure of the center of FIG. 9.

FIG. 10 shows the structure of the center 120. The center 120 includes a LAN communication unit 80, a controller 82, and a storage unit 84. The controller 82 includes an IP address acknowledging unit 86, a request acknowledging unit 88, an authentication unit 90, and a notification unit 92.

The LAN communication unit 80 is connected to the IP network 20 (not shown) and performs communication according to the Internet protocol. As mentioned before, the LAN communication unit 80 is assigned an IP address known to the cell phone terminal 10 and the home gateway apparatus 22. The IP address acknowledging unit 86 receives information on the combination from the home gateway apparatus 22 (not shown) via the LAN communication unit 80. The information on the combination includes the IP address of the home gateway apparatus 22 and the telephone number. The IP address acknowledging unit 86 stores the information on the combination in the storage unit 84.

The request acknowledging unit 88 receives a notification request from the cell phone terminal 10 via the LAN communication unit 80. The request acknowledging unit 88 outputs the notification request thus received to the authentication unit 90. The authentication unit 90 acknowledges the notification request from the request acknowledging unit 88 and extracts the telephone number included in the notification request. The authentication unit 90 refers to the combination stored in the storage unit 84 and searches for the telephone number thus extracted. When the telephone number is identified, the authentication unit 90 determines that the authentication of the telephone number is successful and generates a response to the notification request. In this process, the authentication unit 90 includes the IP address corresponding to the identified telephone number in the response. Further, the authentication unit 90 outputs the response thus generated to the notification unit 92. The notification unit 92 causes the LAN communication unit 80 to transmit the response received from the authentication unit 90. The destination of transmission is the cell phone terminal 10.

Figure 11:
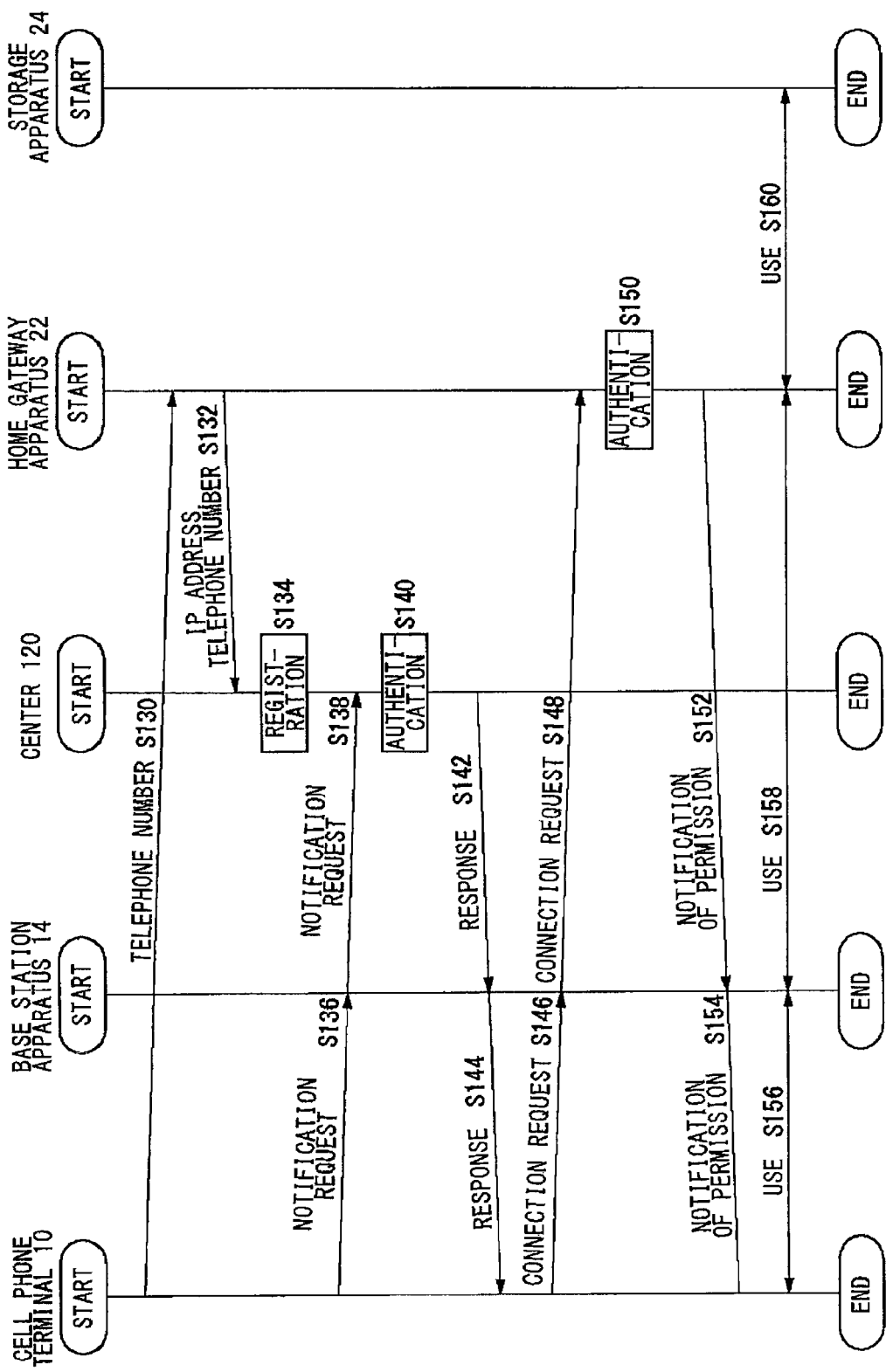
FIG. 11 is a sequence diagram showing the steps performed in the virtual storage system of FIG. 9 to use the storage apparatus.

FIG. 11 is a sequence diagram showing the steps performed in the virtual storage system 110 to use the storage apparatus 24. The cell phone terminal 10 notifies the home gateway apparatus 22 of the telephone number by using the short distance wireless communication system (S130). The home gateway apparatus 22 transmits the combination of the IP address and the telephone number to the center 120 via the IP network 20 (S132). The center 120 registers the combination thus received (S134). The cell phone terminal 10 transmits a notification request to the center 120 via the base station apparatus 14 (S136, S138). The center 120 extracts the telephone number from the notification request thus received and authenticates the telephone number by referring to the combination registered (S140).

The center 120 transmits a response to the cell phone terminal 10 via the base station apparatus 14 (S142, S144). In this process, the center 120 includes the IP address of the home gateway apparatus 22 in the response. The cell phone terminal 10 extracts the IP address from the response received. The cell phone terminal 10 transmits a connection request to the home gateway apparatus 22 via the base station apparatus 14, according to the IP address thus extracted (S146, S148). The subsequent steps 150 through 160 are identical to the steps 20 through 30 of FIG. 5 so that the description thereof is omitted.

Figure 12:
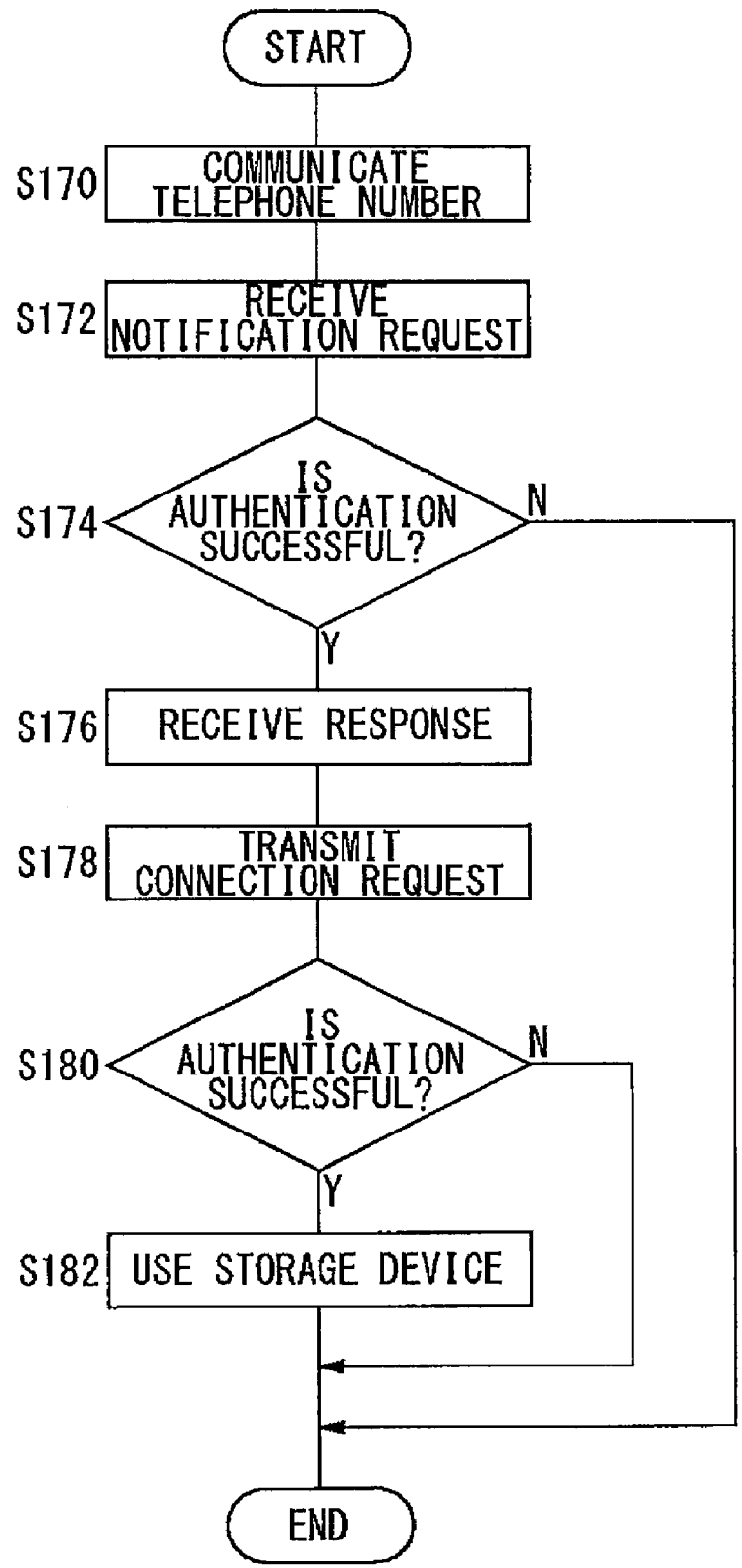
FIG. 12 is a flowchart showing the steps performed in the cell phone terminal of FIG. 9 to use the storage apparatus.

FIG. 12 is a flowchart showing the steps performed in the cell phone terminal 10 to use the storage apparatus 24. The notification unit 50 communicates the telephone number via the short distance wireless communication unit 42 (S170) and causes the cell phone communication unit 40 to transmit a notification request to the center 120 (S172). When the authentication by the center 120 is successful (Y in S174), the acknowledging unit 52 receives a response from the cell phone communication unit 40 (S176). The acknowledging unit 52 extracts the IP address from the response thus received.

The cell phone communication unit 40 transmits a connection request to the home gateway apparatus 22 (S178). When the authentication by the home gateway apparatus 22 is successful (Y in S180), the control 46 and the display unit 48 use the storage apparatus 24 via the cell phone communication unit 40 (S182). When the authentication by the center 120 is not successful (N in S174), or when the authentication by the home gateway apparatus 22 is not successful (N in S180), the process is terminated.

Figure 13:
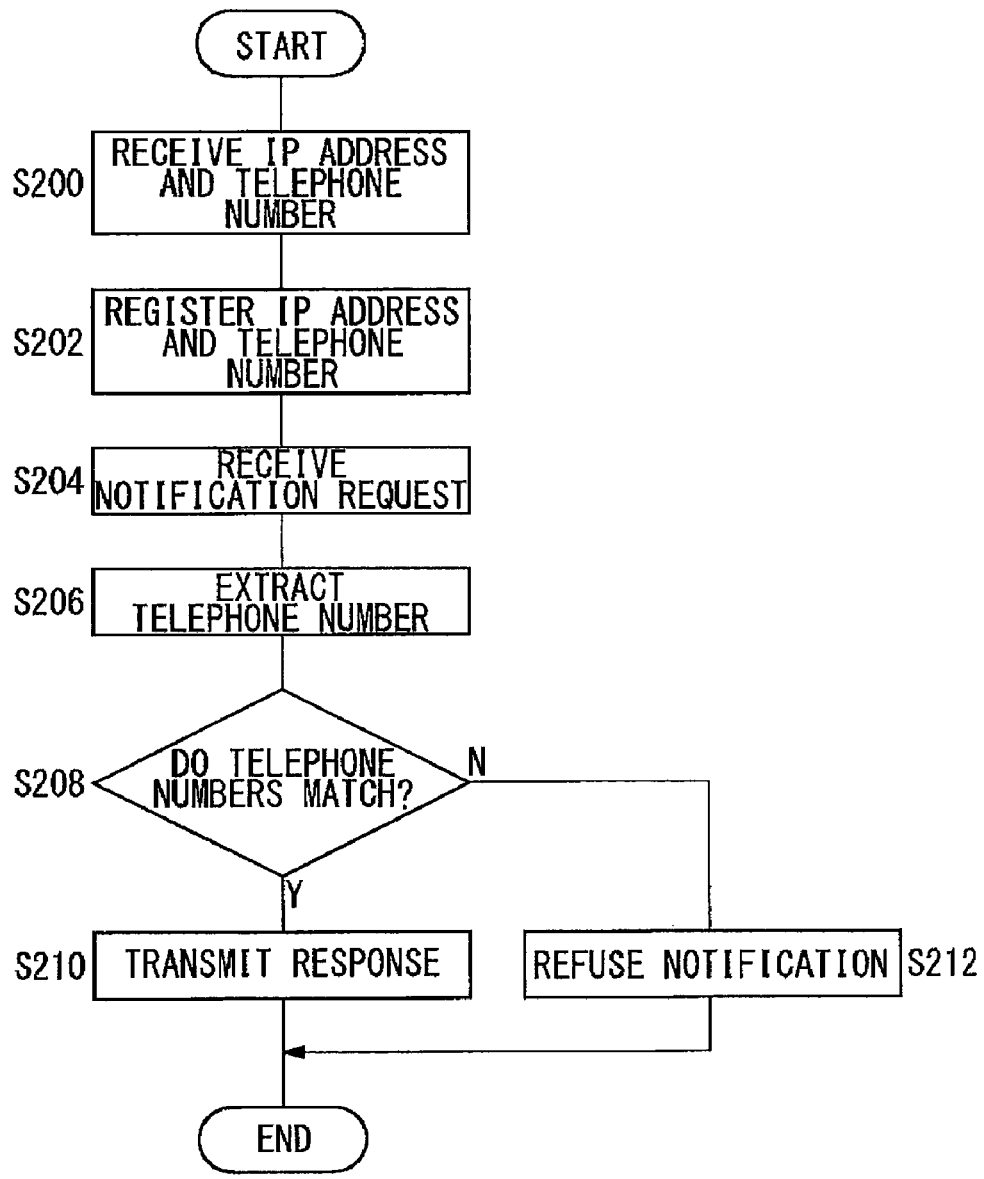
FIG. 13 is a flowchart showing the steps performed in the center of FIG. 10 to communicate a network address.

FIG. 13 is a flowchart showing the steps performed in the center 120 to communicate a network address. The IP address acknowledging unit 86 receives the combination of the IP address and the telephone number from the home gateway apparatus 22 via the LAN communication unit 80 (S200). The IP address acknowledging unit 86 registers the combination of the IP address and the telephone number in the storage unit 84 (S202). The request acknowledging unit 88 receives a notification request from the cell phone terminal 10 via the LAN communication unit 80 (S204). The request acknowledging unit 88 outputs the notification request thus received to the authentication unit 90. The authentication unit 90 extracts the telephone number from the notification request (S206).

When the authentication unit 90 determines that the telephone numbers match (Y in S208), the notification unit 92 transmits a response to the cell phone terminal 10 via the LAN communication unit 80 (S210). In this process, the notification unit 92 includes the IP address of the home gateway apparatus 22 in the response. When the telephone numbers do not match (N in S208), the authentication unit 90 rejects the notification request (S212). The process is then terminated.

A description will now be given of the third variation. The third variation relates to a virtual storage system similar to the systems already described wherein the storage apparatus installed in the house is used from the cell phone terminal. The description already given above pertains to the process whereby the home gateway apparatus authenticates the cell phone terminal requesting the use of the storage apparatus. The following description relates to a case where an authentication process is suspended, i.e., a case where the cell phone terminal is not permitted to use the storage apparatus. For example, when the user in possession of the cell phone terminal arrives at the house, the user is capable of using the storage apparatus without using the cell phone terminal. Even in such a situation, an unauthorized individual may spoof the identity of the user and access the home gateway apparatus in order to use the storage apparatus from another cell phone terminals. There is a need to minimize security risks from such accesses. Upon detecting that the user in possession of the cell phone terminal arrives home, the home gateway apparatus according to the third variation suspends a process of authenticating any connection request from cell phone terminals while the user remains at home.

Figure 14:
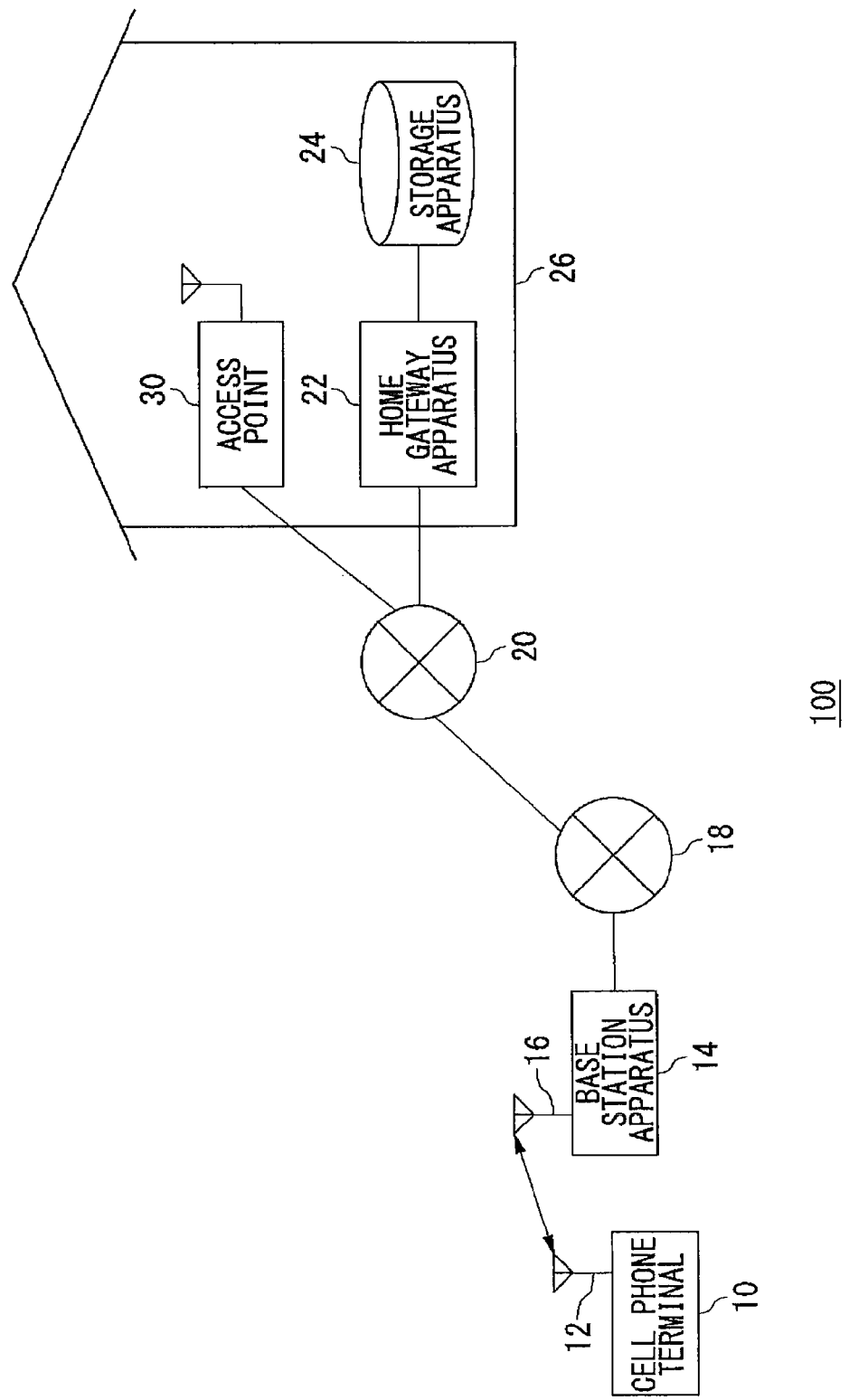
FIG. 14 shows the structure of the virtual storage system according to the third variation.

FIG. 14 shows the structure of the virtual storage system 100 according to the third variation. In addition to the components of the virtual storage system 100 shown in FIG. 1, an access point 30 is added to the virtual storage system 100 of FIG. 14. In addition to the functions described with reference to FIG. 2, the cell phone terminal 10 is provided with the function adapted to the wireless local area network (LAN) system. The publicly known technology may be employed to to implement the wireless LAN system so that the description thereof is omitted. The cell phone terminal 10 in the system of the third variation is provided with the functions for placing telephone calls/communicating via the cell phone network 18 and the functions for placing telephone calls/communicating via the wireless LAN system. Telephone calls via the wireless LAN system may be equated with calls in IP telephone. For example, the user outside the house 26 places telephone calls via the cell phone network 18 and places telephone calls via the wireless LAN system when the user is in the house 26. Such a cell phone terminal 10 is referred to as a dual terminal.

The access point 30 is installed in the house 26. The access point 30 is provided with the function adapted to the wireless LAN system. At one end, the access point 30 communicates with the cell phone terminal 10. At the other end, the access point 30 is connected to the home gateway apparatus 22 via the IP network 20. The access point 30 detects the cell phone terminal 10 when it enters the house 26. For example, the access point 30 broadcasts a signal periodically. The cell phone terminal 10 receiving the signal transmits a communication request to the access point 30. The access point 30 detects the entry of the cell phone terminal 10 into the house 26 by receiving the communication request. When the access point 30 receives a suspension request from the cell phone terminal 10, the access point 30 transmits a suspension request to the home gateway apparatus 22 via the IP network 20. In other words, the access point 30 routes the suspension request from the cell phone terminal 10 to the home gateway apparatus 22.

In addition to the functions described with reference to FIG. 4, the home gateway apparatus 22 is provided with the function of suspending a process of authenticating a connection request when the cell phone terminal 10 is located in the house 26. A description will be given of the structure of the home gateway apparatus 22 with reference to FIG. 4. The controller 64 acknowledges a suspension request from the access point 30 (not shown) via the LAN communication unit 60. As mentioned before, the suspension request is initially output from the cell phone terminal 10 (not shown). The suspension request represents the notification indicating that the cell phone terminal 10 is located in the house 26. Upon acknowledging the suspension request, the controller 64 registers the cell phone terminal 10 originating the request. More specifically, the suspension request includes the telephone number of the cell phone terminal 10 and the controller 64 registers the telephone number included in the suspension request.

The authentication unit 72 acknowledges a connection request from another cell phone terminal 10. The another cell phone terminal 10 represents an apparatus that is not authorized to use the storage apparatus 24 and that spoofs the identity of the authorized cell phone terminal 10. Therefore, the connection request includes the telephone number of the authorized cell phone terminal 10. The authentication unit 72 examines whether the telephone number is registered. When the number is registered, the authentication unit 72 suspends a process of authenticating the connection request. In other words, the authentication unit 72 refuses the connection request from the another cell phone terminal 10. When the connection with the cell phone terminal 10 is cut off and the disconnection continues for a predetermined period of time, the access point 30 informs the home gateway apparatus 22 to cancel the registration. This represents the state where the cell phone terminal 10 is away from the house 26. Upon being prompted to cancel the registration via the LAN communication unit 60, the controller 64 cancels the registration of the telephone number.

Figure 15:
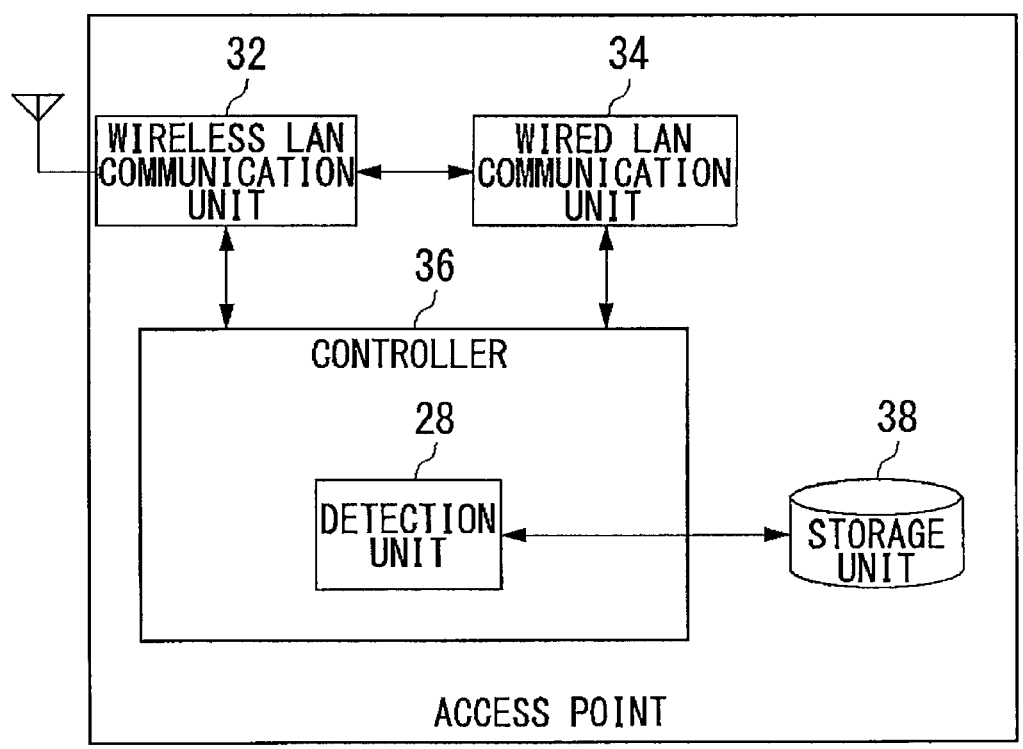
FIG. 15 shows the structure of the access point of FIG. 14.

FIG. 15 shows the structure of the access point 30. The access point 30 includes a wireless LAN communication unit 32, a wired LAN communication unit 34, a controller 36, and a storage unit 38. The controller 36 includes a detection unit 28. The wireless LAN communication unit 32 is provided with the function adapted to the wireless LAN system and performs communication with the cell phone terminal 10 (not shown).

The wireless LAN communication unit 32 broadcasts a broadcast signal periodically. The broadcast signal includes information related to the access point 30 so that the broadcast signal can be said to represent a signal to inform the terminal of the presence of the access point 30. When the wireless LAN communication unit 32 receives a communication request from the cell phone terminal 10 (not shown), the detection unit 28 refers to the list of terminals registered in the storage unit 38 and permits the connection from the cell phone terminal 10. The storage unit 38 stores a list listing the terminals permitted for connection. The detection unit 28 detects whether the cell phone terminal 10 originating the connection request is included in the list. When the connection is permitted, the wireless LAN communication unit 32 notifies the cell phone terminal 10 accordingly.

Subsequently, the wireless LAN communication unit 32 receives a suspension request from the cell phone terminal 10. The suspension request is a signal requesting the registration of the suspension of an authentication process. Upon acknowledging the suspension request, the controller 36 causes the wired LAN communication unit 34 to transmit the suspension request to the storage apparatus 24. The wired LAN communication unit 34 is provided with the same function as the LAN communication unit 60 of FIG. 4. The wireless LAN communication unit 32 monitors the communication with the cell phone terminal 10. When the communication with the cell phone terminal 10 is cut off for a predetermined period of time, the controller 36 requests the storage apparatus 24 to suspend registration via the wired LAN communication unit 34.

Figure 16:
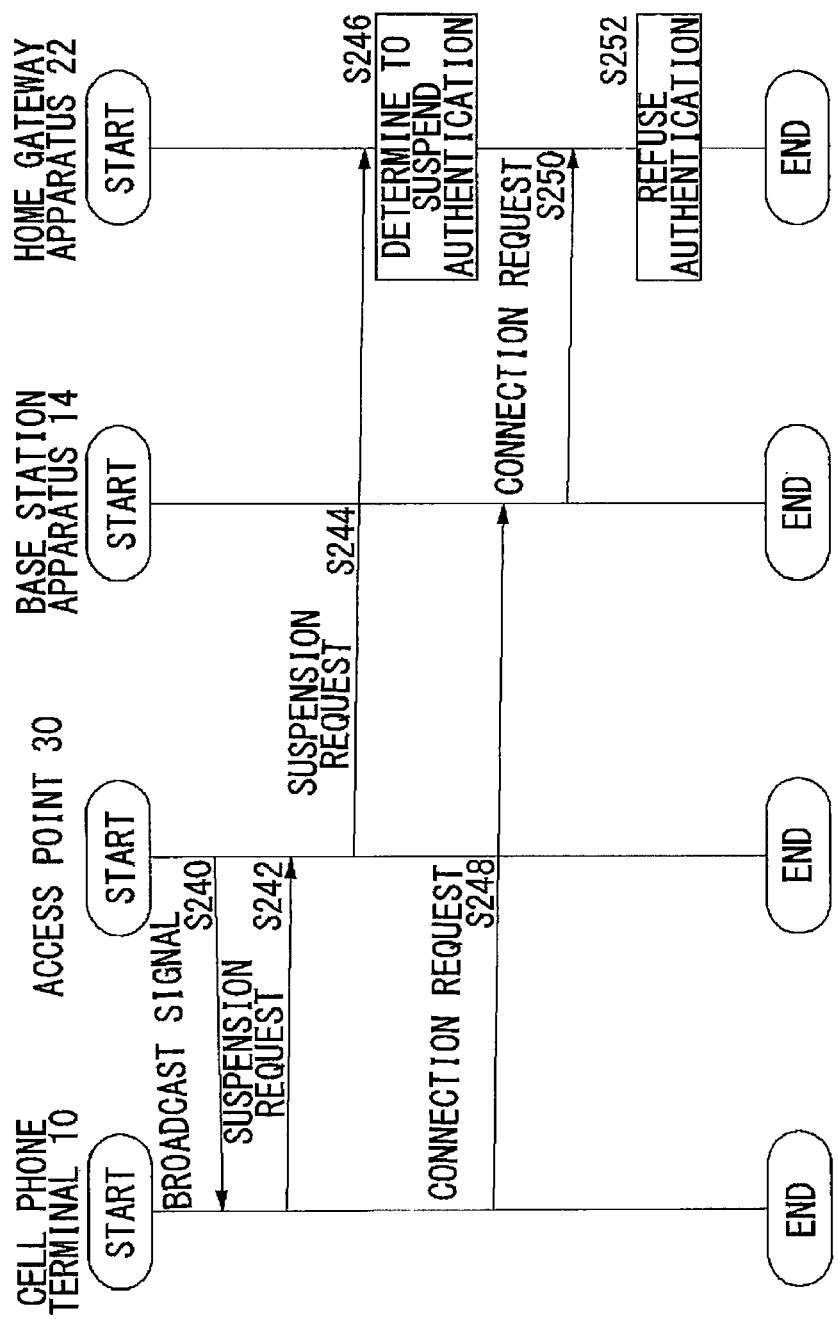
FIG. 16 is a sequence diagram showing the steps performed in the virtual communication system of FIG. 14 to suspend an authentication process.

FIG. 16 is a sequence diagram showing the steps performed in the virtual storage system 100 to suspend an authentication process. The access point 30 broadcasts a broadcast signal (S240). The cell phone terminal 10 transmits a suspension request to the access point 30 (S242). The access point 30 transmits a suspension request to the home gateway apparatus 22 (S244). The home gateway apparatus 22 determines the suspension of authentication (S246). In such a situation, even when the cell phone terminal 10 transmits a connection request to the home gateway apparatus 22 via the base station apparatus 14 (S248, S250), the home gateway apparatus 22 refuses the authentication (S252). The steps 248 through 252 are similarly performed when a terminal other than the cell phone terminal 10 transmits a connection request.

A description will now be given of the fourth variation. The fourth variation relates to a virtual storage system similar to the systems already described wherein the storage apparatus installed in the house is used from the cell phone terminal. The description already given above pertains to the process whereby the home gateway apparatus authenticates the cell phone terminal requesting the use of the storage apparatus. The following description relates to the process performed after authenticating the cell phone terminal. There may a case where a cell phone terminal not supposed to be permitted to access, i.e., a cell phone terminal attempting a spoof attack, may be permitted to use the storage apparatus for some cause. There may also be a case where the telephone number of the cell phone terminal 10 of a user who is not a resident of the house 26 is registered in the home gateway apparatus 22. Minimization of security risks in these situations and a simple way of revising registered telephone numbers in the latter situation are called for. In order to address these requirements, the home gateway apparatus establishes a time of validity of authentication. When the time expires, the home gateway apparatus issues an inquiry to the cell phone terminal to ask whether to continue the use. To continue the use, the user provides an associated input in the cell phone terminal. The cell phone terminal transmits a request for continuation to the home gateway apparatus. In this process, the cell phone terminal transmits, for example, a predefined password. The home gateway apparatus performs a process of authenticating the request for continuation by using information, such as a password, other than the telephone number.

The virtual storage system 100 according to the fourth variation is of the same type as the virtual storage system 100 shown in FIGS. 1, 9, and 14. The cell phone terminal 10 according to the fourth variation is of the same type as the cell phone terminal 10 shown in FIG. 2, and the home gateway apparatus 22 is of the same type as the home gateway apparatus 22 shown in FIG. 4. Therefore, the following description highlights the differences. The authentication unit 72 of the home gateway apparatus 22 authenticates a connection request from the cell phone terminal 10, as described above. Subsequently, the cell phone terminal 10 uses the storage apparatus 24 via the home gateway apparatus 22. Meanwhile, the controller 64 measures time elapsed since the permission for connection is given to the cell phone terminal 10. The controller 64 predefines a time of validity of authentication and compares the time of validity and the measured time. When the time of validity of authentication is expires, the controller 64 issues an inquiry to the cell phone terminal 10 via the LAN communication unit 60 to ask whether to continues the communication path, i.e., whether to continue to use the storage apparatus 24.

Upon acknowledging the inquiry, the cell phone terminal 10 displays the fact on the display unit 48. The cell phone terminal 10 also acknowledges a response to the inquiry from the user via the control 46. The response indicates either continuation or suspension. In case of continuation, the cell phone terminal 10 acknowledges the predefined password via the control 46. The central controller 44 transmits the response and the password via the cell phone communication unit 40. The controller 64 of the storage apparatus 24 acknowledges the response from the cell phone terminal 10 via the LAN communication unit 60. When the response indicates continuation, the controller 64 also acknowledges the password. The authentication unit 72 performs a new authentication process by using the password, which is information different from the telephone number. As a result of authentication, the use of the storage apparatus 24 by the cell phone terminal 10 is continued. The aforementioned process may be repeated each time the time of validity expires.

Figure 17:
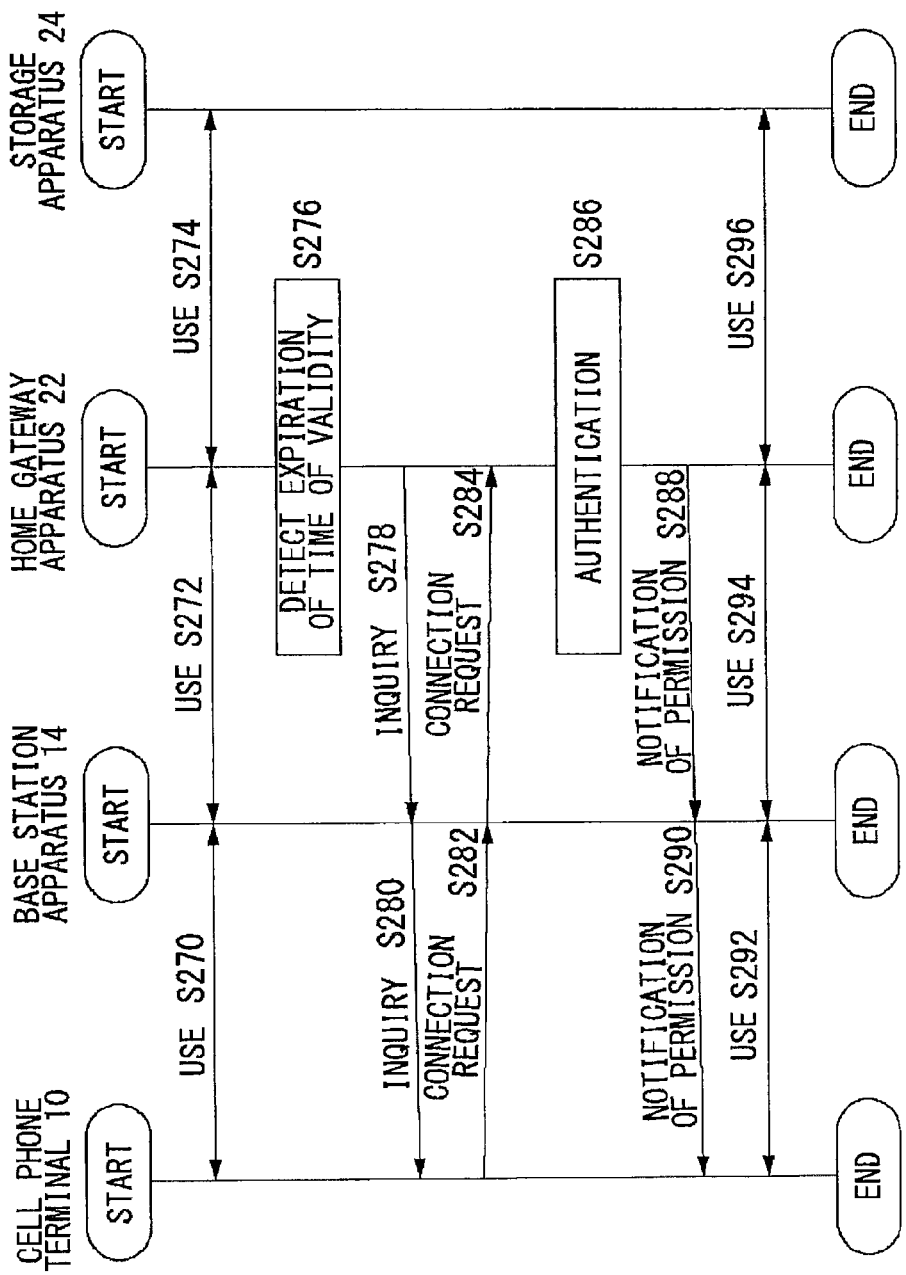
FIG. 17 is a sequence diagram showing the steps performed in the virtual communication system according to the fourth variation to continue an authentication process.

FIG. 17 is a sequence diagram showing the steps performed in the virtual storage system 100 according to the fourth variation to continue an authentication process. The cell phone terminal 10 uses the storage apparatus 24 via the base station apparatus 14 and the home gateway apparatus 22 (S270, S272, S274). These steps correspond to the steps 26 through 30 of FIG. 5, the steps 110 through 114 of FIG. 8, and the steps 156 through 160 of FIG. 11. The home gateway apparatus 22 detects the expiration of the time of validity (S276) and issues an inquiry to the cell phone terminal 10 via the base station apparatus 14 to ask whether continuation is required (S278, S280). The cell phone terminal 10 issues a request for continuation to the home gateway apparatus 22 via the base station apparatus 14 (S282, S284). In this process, the password is also transmitted. The home gateway apparatus 22 authenticates the request for continuation based on the password (S286). The home gateway apparatus 22 transmits a notification of permission to the cell phone terminal 10 via the base station apparatus 14 (S288, S290). Subsequently, the cell phone terminal 10 uses the storage apparatus 24 via the base station apparatus 14 and the home gateway apparatus 22 (S292, S294, S296).

Figure 18:
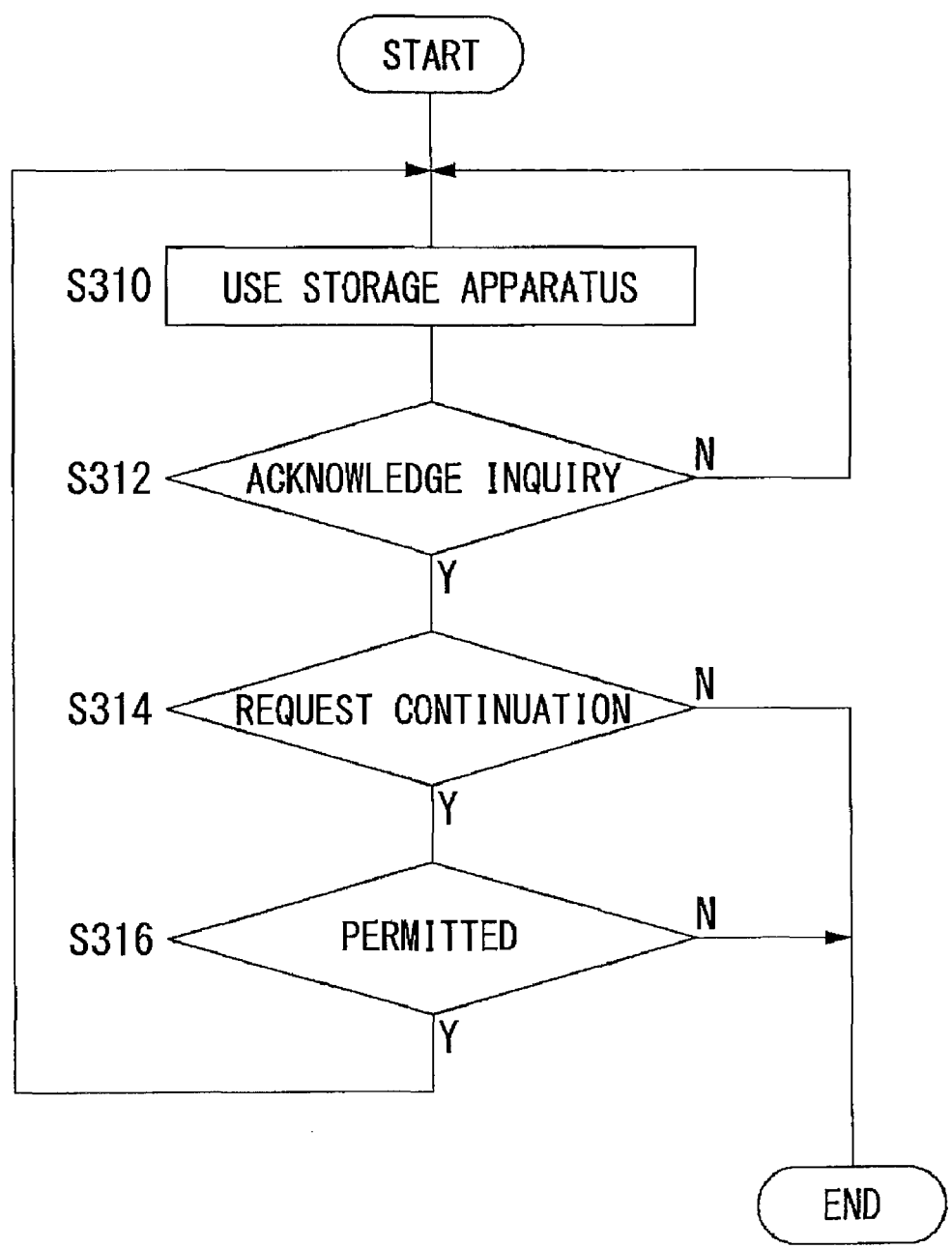
FIG. 18 is a flowchart showing the steps performed in the cell phone terminal according to the fourth variation to continue an authentication process.

FIG. 18 is a flowchart showing the steps performed in the cell phone terminal 10 according to the fourth variation to continue an authentication process. The control 46 and the display unit 48 use the storage apparatus 24 via the cell phone communication unit 40 (S310). When the cell phone communication unit 40 does not acknowledge an inquiry (N in S312), control is returned to the step 310. When the cell phone communication unit 40 acknowledges an inquiry (Y in S312), and when the user requests continuation via the control 46 (Y in S314), the cell phone communication unit 40 transmits the request to the home gateway apparatus 22. When the cell phone communication unit 40 acknowledges permission to the request for continuation, (Y in S316), control is returned to the step S310. When continuation is not requested by the user via the control 46 (N in S314), or when the cell phone communication unit 40 does not acknowledge permission to the request for continuation (N in S316), the process is terminated.

Figure 19:
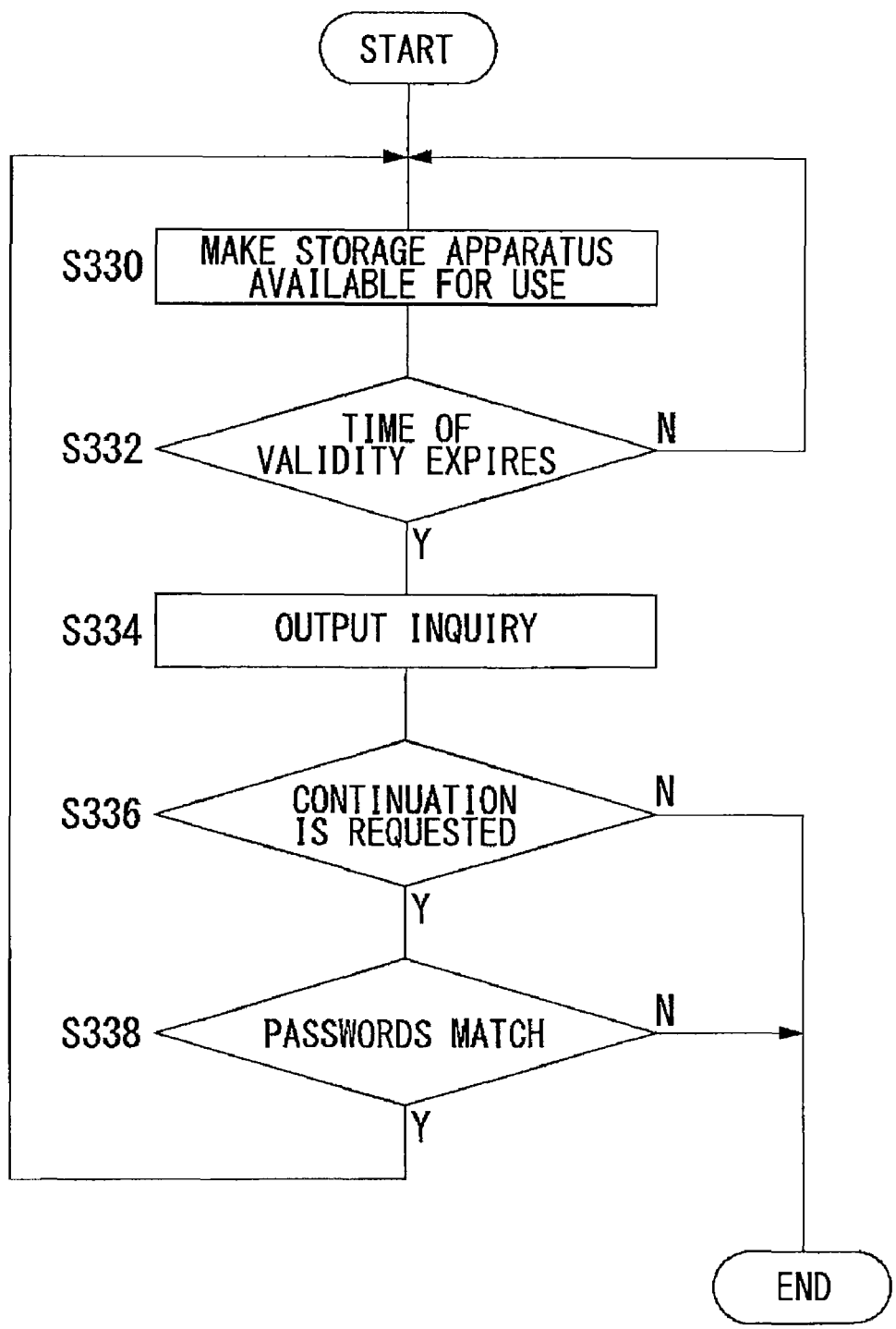
FIG. 19 is a flowchart showing the steps performed in the home gateway apparatus according to the fourth variation to continue an authentication process.

FIG. 19 is a flowchart showing the steps performed in the home gateway apparatus 22 according to the fourth variation to continue an authentication process. The LAN communication unit 60, the controller 64, and the connection unit 66 allow the cell phone terminal 10 to use the storage apparatus 24 (S330). When the time of validity does not expire (N in S332), the controller 64 returns to the step 330. When the time of validity expires (Y in S332), the controller 64 outputs an inquiry via the LAN communication unit 60 to ask whether continuation is required (S334). When continuation is requested (Y in S336), the authentication unit 72 performs an authentication process based on the password. When the passwords match (Y in S338), control is returned to the step 330. When connection is not requested (N in S336), or when the passwords do not match (N in S338), the process is terminated.

According to the embodiment the present invention, the home gateway apparatus acknowledges the telephone number, and allows the cell phone terminal to use the storage apparatus when the home gateway apparatus authenticates the cell phone terminal based on the telephone number. Therefore, the storage apparatus is made available for use by the cell phone terminal in a secure and simple manner. Since the telephone number is used to authenticate the cell phone terminal, the storage apparatus is made available for use by the cell phone terminal in a secure and simple manner. Communication of the telephone number at an initial stage is performed without using the network so that security is improved. Since the telephone number is used for authentication, no additional operations are required for the user using the cell phone terminal so that convenience is improved.

Also, authentication of a connection request also serves the purpose of authentication of access to the storage apparatus so that the process is simplified. The cell phone terminal is capable of using the storage apparatus via the network when the terminal is authenticated based on the telephone number it communicated. Thus, the terminal is capable of using the storage apparatus in a secure and simple manner. Once being connected to the storage apparatus, the user is capable of using the storage apparatus from the cell phone terminal without any additional processes for connection so that the user convenience is improved. When the cell phone terminal is located in the house, authentication of requests for connection are suspended. Accordingly, cell phone terminals attempting a spoof attack for connection are refused. Since requests for connection from cell phone terminals attempting a spoof attack are refused, the security is improved. Since the authentication is performed afresh when the time of validity expires such that the telephone number originally used for authentication is not used, connection from a cell phone terminal attempting a spoof attack, if maintained so far, is cut off. Since the connection from the cell phone terminal attempting a spoof attack is cut off, the security is improved.

Described above is an explanation based on the embodiment. The embodiment is intended to be illustrative only and it will be obvious to those skilled in the art that various modifications to constituting elements and processes could be developed and that such modifications are also within the scope of the present invention.

In the described embodiment, the IP address of the home gateway apparatus 22 is communicated to the cell phone terminal 10 as the network address of the home gateway apparatus 22. Alternatively, the URL of the home gateway apparatus 22 may be communicated to the cell phone terminal 10 as the network address of the home gateway apparatus 22. In this case, a dynamic domain name system (DDNS) server (not shown) is installed in the IP network 20. The cell phone terminal 10 transmits a connection request to the DNS server via the base station apparatus 14, the cell phone network 18, and the IP network 20. The DDNS server converts the URL of the home gateway apparatus 22 into the IP address. According to this variation, the present invention can be applied to various network configurations. In other words, what is required is that the network address of the home gateway apparatus 22 is identified as the destination of communication.

In the described embodiment, the storage apparatus 24 is provided outside the home gateway apparatus 22 and connected to the home gateway apparatus 22. Alternatively, the storage apparatus 24 may be built in the home gateway apparatus 22 and connected to the home gateway apparatus 22 by a data bus. In this case, the home gateway apparatus 22 need not communicate the network address for identifying the storage apparatus 24 to the cell phone terminal 10. According to this variation, the present invention can be applied to various embodiments of the home gateway apparatus 22.

In the embodiment of the present invention, a single storage area in the storage apparatus 24 is assumed and the cell phone terminal 10 uses the single storage area. Alternatively, the storage area of the storage apparatus 24 may be divided into a plurality of individual storage areas. Still alternatively, the storage apparatus 24 may be formed as a set of a plurality of storage areas. In this case, the identification number of the storage area desired to be used by the cell phone terminal 10 may be communicated concurrently when the telephone number is communicated from the cell phone terminal 10 to the home gateway apparatus 22 using the short distance wireless communication system. For example, given that storage areas "A" through "C" are located in the storage apparatus 24, the identification number indicating one of "A" through "C" or an arbitrary combination thereof is communicated from the cell phone terminal 10 to the home gateway apparatus 22. Upon completion of the authentication by the authentication unit 72, the home gateway apparatus 22 and the storage apparatus 24 allow the cell phone terminal 10 to use only the storage area corresponding to the identification number acknowledged. According to this variation, detailed setting of the use of the storage apparatus 24 is possible so that convenience in terms of management of the storage apparatus 24 is improved.

In this variation, when the access point 30 acknowledges a suspension request from the cell phone terminal 10, the home gateway apparatus 22 determines to suspend an authentication process. Alternatively, a PC connected to the home gateway apparatus 22 may be provided so that the user may request the home gateway apparatus 22 to suspend an authentication process via the PC. In other words, the execution or suspension of an authentication process may be requested manually. According to this variation, the user's intent can be reflected in the execution or suspension an authentication process.

Further, the home gateway apparatus 22 may suspend an authentication process even when the access point 30 does not acknowledge a suspension request. When the user in possession of the cell phone terminal 10 arrives at the house 26, the access point 30 receives a communication request from the cell phone terminal 10 as already described. The access point 30 also notifies the home gateway apparatus 22 accordingly with an associated output. Upon receipt of the communication request, the controller 64 of the home gateway apparatus 22 learns that the cell phone terminal 10 arrives the house 26 and performs the same process as performed when the suspension request is acknowledged. According to this variation, an authentication process can be suspended even if a suspension request is not transmitted.

Alternatively, a plurality of cell phone terminals 10 may be registered in the home gateway apparatus 22 and the home gateway apparatus 22 may suspend an authentication process when the apparatus detects that all of the terminals have switched to communication using the wireless LAN system. In other words, the home gateway apparatus 22 may suspend an authentication process when the plurality of cell phone terminals 10 are located in the house 26. That the terminal is switched to communication using the wireless LAN communication system is detected by acknowledging a suspension request or a communication request, as described above.

In the described embodiment, the access point 30 is installed in the house 26 like the storage apparatus 24. Alternatively, the access point 30 may be located other than in the house 26. For example, the access point 30 may be located at a work place. According to this variation, security is improved even in cases where the access point 30 is located other than in the house 26. In other words, the access point 30 may be located where the user need not use the storage apparatus 24 via the cell phone terminal 10.

In the described embodiment, the home gateway apparatus 22 acknowledges a request for continuation and a password from the cell phone terminal 10. In other words, a request for continuation and provision of information for authentication are performed in one step. Alternatively, these steps may be performed separately. In the first step, the cell phone terminal 10 transmits a request for continuation to the home gateway apparatus 22. The home gateway apparatus 22 transmits a predefined question to the cell phone terminal 10 and the cell phone terminal 10 returns a reply to the question to the home gateway apparatus 22. The home gateway apparatus 22 may store an expected response and permit the continuation when the response stored and the response acknowledged match. According to this variation, authentication for continuation can be implemented in a variety of methods.

Industrial Applicability

According to the present invention, the storage apparatus is made available for use by the cell phone terminal in a secure and simple manner.

The invention claimed is:

1. A communication apparatus adapted to be connected to a cell phone terminal via a first communication network and a second communication network and to control read and write operations in a predetermined storage apparatus by the cell phone terminal, comprising:

an acknowledging unit operable to acknowledge, using the first communication network, a telephone number of the cell phone terminal, wherein the telephone number is received from the cell phone terminal;

a notification unit operable to communicate a network address of the communication apparatus to the cell phone terminal that had the telephone number acknowledged by the acknowledging unit, wherein the network address is an address on the second communication network and the network address is communicated using the first communication network;

an authentication unit operable, upon acknowledging a connection request from the cell phone terminal at the network address communicated by the notification unit, the connection request including the telephone number of the cell phone terminal, to perform a process of authenticating the connection request, based on the telephone number of the cell phone terminal received by the authentication unit and the telephone number acknowledged by the acknowledging unit, wherein the connection request is received using the second communication network; and a communication unit operable to establish a communication path to make the storage apparatus available for use by the cell phone terminal authenticated by the authentication unit wherein the communication path is established over the second communication network.

2. The communication apparatus according to claim 1, wherein the acknowledging unit acknowledges a notification indicating that the cell phone terminal is located within a predetermined area, and the authentication unit suspends a process of authenticating the connection request when the acknowledging unit acknowledges the notification.

3. The communication apparatus according to claim 1, further comprising:
an inspection unit operable to issue, using the second communication network via the communication unit, an inquiry to the cell phone terminal to ask whether to continue the communication path before a time of validity of authentication by the authentication unit expires, wherein
the authentication unit performs a new authentication process by using information other than the telephone number when it is known that the cell phone terminal requests the continuation of the communication path, using the second communication network, as a result of the inquiry by the inspection unit.

4. The communication apparatus according to claim 1, wherein:
the first communication network is a short distance communication network; and
the second communication network is an Internet Protocol network.

5. A cell phone terminal adapted to be connected, via a first communication network and a second communication network, to a communication apparatus connected to a storage apparatus, and to perform read and write operations in the storage apparatus, comprising:
a notification unit operable to communicate, using the first communication network, a telephone number of the cell phone terminal to the communication apparatus;
an acknowledging unit operable to acknowledge a network address of the communication apparatus that the notification unit communicated the telephone number to, wherein the network address is an address on the second communication network and the network address is communicated using the first communication network;
a requesting unit operable to request a connection to the network address acknowledged by the acknowledging unit using the second communication network, wherein the request includes the telephone number of the cell phone terminal; and
a communication unit operable to perform communication for reading and writing in the storage apparatus via the communication apparatus over the second communication network, when the communication apparatus authenticates the connection request, based on the telephone number provided by the requesting unit and the telephone number already communicated.

6. The cell phone terminal according to claim 5, wherein:
the first communication network is a short distance communication network; and
the second communication network is an Internet Protocol network.

7. A communication system adapted to communicate via a first communication network and a second communication network comprising:
a communication apparatus connected to a storage apparatus; and
a cell phone terminal adapted to be connected to the communication apparatus and to perform read and write operations in the storage apparatus, wherein
upon acknowledging a telephone number of the cell phone terminal from the cell phone terminal, the communication apparatus communicates a network address of the communication apparatus to the cell phone terminal, wherein the network address and the telephone number to be acknowledged are communicated using the first communication network and the network address is an address on the second communication network, and
upon acknowledging a connection request from the cell phone terminal to the network address, wherein the connection request includes a telephone number of the cell phone terminal and the connection request is communicated using the second communication network, the communication apparatus performs a process of authenticating the connection request, based on the telephone number of the cell phone terminal included in the connection request and the telephone number already acknowledged, so as to establish a communication path on the second communication network to make the storage apparatus available for use by the authenticated cell phone terminal via the second communication network.

8. The communication system according to claim 7, wherein
the communication apparatus suspends a process of authenticating a connection request when the communication apparatus is notified that the cell phone terminal is located within a predetermined area.

9. The communication system according to claim 7, wherein
the communication apparatus issues an inquiry, using the second communication network, to the cell phone terminal to ask whether to continue the communication path before a time of validity of authentication of the connection request expires, and performs a new authentication process by using information other than the telephone number when the cell phone terminal requests, using the second communication network, the continuation of the communication path.

10. The cell phone terminal according to claim 7, wherein:
the first communication network is a short distance communication network; and
the second communication network is an Internet Protocol network.

11. A communication method using a first communication network and a second communication network comprising:
communicating a telephone number of a cell phone terminal from the cell phone terminal to a communication apparatus using the first communication network; and
communicating a network address of the communication apparatus from the communication apparatus to the cell phone terminal, wherein the network address is an address on the second communication network and the network address is communicated using the first communication network, and
upon acknowledging a connection request from the cell phone terminal to the network address, wherein the connection request includes a telephone number of the cell phone terminal and the connection request is communicated using the second communication network, the communication apparatus performs an authentication process, based on the telephone number of the cell phone terminal included in the connection request and the telephone number already communicated using the first communication network, and control read and write operations in the storage apparatus by the cell phone terminal via the network.

12. The cell phone terminal according to claim 11, wherein:
the first communication network is a short distance communication network; and
the second communication network is an Internet Protocol network.

* * * * *